United States Patent
Agarwal et al.

(10) Patent No.: US 12,369,159 B2
(45) Date of Patent: *Jul. 22, 2025

(54) MACRO AND MICRO DISCONTINUOUS TRANSMISSION

(71) Applicant: QUALCOMM Incorporated, San Diego, CA (US)

(72) Inventors: Ravi Agarwal, San Diego, CA (US); Gavin Bernard Horn, La Jolla, CA (US)

(73) Assignee: QUALCOMM Incorporated, San Diego, CA (US)

( * ) Notice: Subject to any disclaimer, the term of this patent is extended or adjusted under 35 U.S.C. 154(b) by 512 days.

This patent is subject to a terminal disclaimer.

(21) Appl. No.: 17/474,896

(22) Filed: Sep. 14, 2021

(65) Prior Publication Data
US 2022/0070917 A1    Mar. 3, 2022

Related U.S. Application Data

(63) Continuation of application No. 15/188,854, filed on Jun. 21, 2016, now Pat. No. 11,129,185.

(60) Provisional application No. 62/265,256, filed on Dec. 9, 2015, provisional application No. 62/265,244, filed on Dec. 9, 2015, provisional application No. 62/265,249, filed on Dec. 9, 2015.

(51) Int. Cl.
| | |
|---|---|
| *H04W 72/23* | (2023.01) |
| *H04W 52/02* | (2009.01) |
| *H04W 72/20* | (2023.01) |
| *H04W 76/28* | (2018.01) |

(52) U.S. Cl.
CPC ....... *H04W 72/23* (2023.01); *H04W 52/0216* (2013.01); *H04W 72/20* (2023.01); *H04W 76/28* (2018.02); *Y02D 30/70* (2020.08)

(58) Field of Classification Search
None
See application file for complete search history.

(56) References Cited

U.S. PATENT DOCUMENTS

| | | |
|---|---|---|
| 7,813,296 B2 | 10/2010 | Lindoff et al. |
| 8,144,679 B2 | 3/2012 | Cai et al. |

(Continued)

FOREIGN PATENT DOCUMENTS

| | | | |
|---|---|---|---|
| AU | 2005287985 B2 * | 2/2010 | ............ H04W 28/06 |
| CN | 101483446 A | 7/2009 | |

(Continued)

OTHER PUBLICATIONS

European Search Report—EP20198912—Search Authority—Berlin—Dec. 16, 2020.

(Continued)

*Primary Examiner* — Walter J Divito
(74) *Attorney, Agent, or Firm* — Holland & Hart LLP

(57) ABSTRACT

Methods, systems, and devices for wireless communication are described. A wireless device may receive during an active duration, an indication of an opportunity to request uplink (UL) transmission. The wireless device may identify an opportunity to request UL transmission based at least in part on the indication. In some cases, the active duration may be a discontinuous transmission (DTX) configuration. The wireless device may then transmit on the UL resources during the opportunity to request UL transmission.

28 Claims, 17 Drawing Sheets

(56) References Cited

U.S. PATENT DOCUMENTS

| | | |
|---|---|---|
| 8,165,166 B2 | 4/2012 | Fischer |
| 8,169,957 B2 | 5/2012 | Damnjanovic |
| 8,265,682 B2 | 9/2012 | Bertrand et al. |
| 8,725,145 B2 | 5/2014 | Mutya et al. |
| 9,204,389 B2 | 12/2015 | Godor et al. |
| 9,225,759 B2 | 12/2015 | Vannithamby et al. |
| 9,351,250 B2 | 5/2016 | Jafarian et al. |
| 9,374,845 B2 | 6/2016 | Xu et al. |
| 10,349,466 B2 | 7/2019 | Agarwal et al. |
| 10,524,206 B2 | 12/2019 | Agarwal et al. |
| 10,652,822 B2 | 5/2020 | Agarwal et al. |
| 11,076,352 B2 | 7/2021 | Agarwal et al. |
| 11,129,185 B2 | 9/2021 | Agarwal et al. |
| 2007/0189205 A1 | 8/2007 | Terry et al. |
| 2008/0279139 A1 | 11/2008 | Beziot et al. |
| 2009/0073907 A1 | 3/2009 | Cai |
| 2009/0180414 A1 | 7/2009 | Maeda et al. |
| 2011/0003555 A1 | 1/2011 | Guo |
| 2011/0128925 A1 | 6/2011 | Lindoff et al. |
| 2011/0274074 A1 | 11/2011 | Lee et al. |
| 2012/0172081 A1 | 7/2012 | Love et al. |
| 2013/0201892 A1 | 8/2013 | Holma et al. |
| 2013/0258919 A1 | 10/2013 | Damnjanovic |
| 2013/0272181 A1 | 10/2013 | Fong et al. |
| 2014/0003314 A1 | 1/2014 | Shu et al. |
| 2014/0071873 A1 | 3/2014 | Wang et al. |
| 2014/0198665 A1 | 7/2014 | Cai |
| 2014/0254452 A1 | 9/2014 | Golitschek Edler Von Elbwart et al. |
| 2014/0254538 A1 | 9/2014 | Park et al. |
| 2014/0269480 A1 | 9/2014 | Han |
| 2014/0301261 A1 | 10/2014 | Godor et al. |
| 2015/0078238 A1 | 3/2015 | Cai |
| 2015/0078307 A1 | 3/2015 | Ohta et al. |
| 2015/0110093 A1 | 4/2015 | Asterjadhi et al. |
| 2015/0117289 A1 | 4/2015 | Voigt et al. |
| 2015/0124674 A1 | 5/2015 | Jamadagni et al. |
| 2015/0223228 A1 | 8/2015 | Rune et al. |
| 2015/0230112 A1 | 8/2015 | Siomina et al. |
| 2015/0282198 A1 | 10/2015 | Wang et al. |
| 2016/0037578 A1 | 2/2016 | Shah et al. |
| 2016/0080133 A1 | 3/2016 | Golitschek Edler Von Elbwart et al. |
| 2016/0088681 A1 | 3/2016 | Chang et al. |
| 2016/0157164 A1 | 6/2016 | Lee et al. |
| 2016/0294531 A1* | 10/2016 | Loehr ............... H04W 72/21 |
| 2017/0171818 A1 | 6/2017 | Agarwal et al. |
| 2017/0171907 A1 | 6/2017 | Agarwal et al. |
| 2017/0171908 A1 | 6/2017 | Agarwal et al. |
| 2017/0250786 A1 | 8/2017 | Better et al. |
| 2017/0332288 A1 | 11/2017 | Sadek et al. |
| 2017/0367003 A1 | 12/2017 | Zhang et al. |
| 2018/0035329 A1 | 2/2018 | Futaki |
| 2018/0220371 A1 | 8/2018 | Agarwal et al. |
| 2020/0336983 A1 | 10/2020 | Agarwal et al. |
| 2021/0377862 A1 | 12/2021 | Agarwal et al. |
| 2024/0214933 A1 | 6/2024 | Agarwal et al. |

FOREIGN PATENT DOCUMENTS

| | | |
|---|---|---|
| CN | 1732698 B | 10/2012 |
| CN | 103139920 A | 6/2013 |
| CN | 104205993 A | 12/2014 |
| EP | 2410804 A1 | 1/2012 |
| EP | 2688347 A1 | 1/2014 |
| EP | 2704513 A1 | 3/2014 |
| EP | 2785112 A1 | 10/2014 |
| EP | 2876969 A3 | 9/2015 |
| KR | 20090116783 A | 11/2009 |
| KR | 20140107596 A | 9/2014 |
| WO | WO-2008035905 A1 | 3/2008 |
| WO | WO2008151407 A1 | 12/2008 |
| WO | WO2009033253 A1 | 3/2009 |
| WO | WO2009120124 A1 | 10/2009 |
| WO | WO-2010013960 A2 | 2/2010 |
| WO | WO-2012103034 A1 | 8/2012 |
| WO | WO-2013009110 A2 | 1/2013 |
| WO | WO2013173814 A1 | 11/2013 |
| WO | WO-2014121016 A1 | 8/2014 |
| WO | WO-2014174877 A1 | 10/2014 |
| WO | WO-2015116866 A1 | 8/2015 |

OTHER PUBLICATIONS

International Preliminary Report on Patentability—PCT/US2016/064589, The International Bureau of WIPO—Geneva, Switzerland, Feb. 12, 2018.
International Preliminary Report on Patentability—PCT/US2016/064595, The International Bureau of WIPO—Geneva, Switzerland, Feb. 12, 2018.
International Preliminary Report on Patentability—PCT/US2016/064695, The International Bureau of WIPO—Geneva, Switzerland, Feb. 12, 2018.
International Search Report and Written Opinion—PCT/US2016/064589—ISA/EPO—Apr. 21, 2017.
International Search Report and Written Opinion—PCT/US2016/064595—ISA/EPO—Apr. 21, 2017.
International Search Report and Written Opinion—PCT/US2016/064695—ISA/EPO—Apr. 21, 2017.
Lin D., et al., "Uplink Contention Based Multiple Access for 5G Cellular IoT," IEEE 82nd Vehicular Technology Conference (VTC Fall), 2015, pp. 1-5.
NOKIA: "Active Mode DRX", 3GPP TSG-RANWG2 Meeting #55, R2-062752, Oct. 9-13, 2006. Seoul. Korea, XP002463499, 3Pages, the Whole Document.
Szabo G., et al., "Service Aware Adaptive DRX Scheme," Globecom Workshops (GC Wkshps), Dec. 2014, pp. 1132-1138.
Taiwan Search Report—TW105139015—TIPO—Aug. 24, 2020.
Huawei et al: "On the relationship between re-tuning time and bandwidth reduction", 3GPP Draft; R1-143710, 3rd Generation Partnership Project (3GPP), Mobile Competence Centre; 650, Route Des Lucioles; F-06921 Sophia-Antipolis Cedex; France vol. RAN WG1, no. Ljubljana, Slovenia; Oct. 6, 2014-Oct. 10, 2014 Sep. 27, 2014 (Sep. 27, 2014), XP050869396, 5 pages.
Sony Corporation: "MTC Operation with a Narrowband PDCCH", 3GPP TSG-RAN WG1 Meeting #80, R1-150428, Athens, Greece, Feb. 9-13, 2015, 16 Pages, Feb. 18, 2015.

* cited by examiner

MACRO AND MICRO DISCONTINUOUS TRANSMISSION

CROSS REFERENCES

The present Application for Patent is a Continuation of U.S. patent application Ser. No. 15/188,854 by Agarwal et al., entitled "Macro and Micro Discontinuous Transmission" filed Jun. 21, 2016, which claims priority to U.S. Provisional Patent Application No. 62/265,256 by Agarwal et al., entitled "Macro and Micro Discontinuous Transmission," filed Dec. 9, 2015, assigned to the assignee hereof, and is expressly incorporated by reference herein; U.S. Provisional Patent Application No. 62/265,244 by Agarwal, et al., entitled "Macro and Micro Discontinuous Reception," filed Dec. 9, 2015, assigned to the assignee hereof, and is expressly incorporated by reference herein; and U.S. Provisional Patent Application No. 62/265,249 by Agarwal, et al., entitled "Receiving on Transmit and Transmitting on Receive," filed Dec. 9, 2015, assigned to the assignee hereof, and is expressly incorporated by reference herein.

The presented Application for Patent is related to the following co-pending U.S. patent application Ser. No. 15/188,720 by Agarwal, et al., entitled "Macro and Micro Discontinuous Reception." filed Jun. 21, 2016, assigned to the assignee hereof, and expressly incorporated by reference herein; and U.S. patent application Ser. No. 15/188,798 by Agarwal et al., entitled "Receiving Upon Transmit and Transmitting Upon Receive," filed Jun. 21, 2016, assigned to the assignee hereof, and expressly incorporated by reference herein.

INTRODUCTION

The following relates generally to wireless communication, and more specifically to macro and micro discontinuous transmission (DTX).

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, and orthogonal frequency division multiple access (OFDMA) systems.

A wireless multiple-access communications system may include a number of base stations, each simultaneously supporting communication for multiple communication devices, which may be otherwise known as user equipment (UE). A UE may transmit a scheduling request (SR) to indicate to a base station that it has uplink (UL) data to transmit. In some cases, SR transmissions may be transmitted during periodic intervals, which may be independent of UL traffic activity. These intervals may introduce latency for UL transmissions when UL activity is high, and monitoring them may increase power consumption and processing complexity on the base station side when activity is low.

SUMMARY

A wireless device may establish an uplink (UL) discontinuous transmission (DTX) configuration. An UL grant may be received during an on duration of the DTX configuration, and the wireless device may transmit data during a transmission opportunity based at least in part on the UL grant. In some case, the device may transmit a request for UL transmission (RULT) during the on duration, and the grant may be based at least in part on the RULT. In some cases, the wireless device may, additionally or alternatively, receive an indication of a subsequent transmission opportunity. Prior to the subsequent transmission opportunity a dynamic on duration may be used to transmit a RULT or receive an UL grant. The wireless device may then transmit during the additional transmission opportunity if UL data is available.

A method of wireless communication is described. The method may include receiving during an active duration, an indication of an opportunity to request uplink (UL) transmission, identifying an opportunity to request UL transmission based at least in part on the indication and transmitting on UL resources during the opportunity to request UL transmission. An apparatus for wireless communication is described. The apparatus may include means for receiving during an active duration, an indication of an opportunity to request uplink (UL) transmission, means for an opportunity to request UL transmission based at least in part on the indication and means for transmitting on UL resources during the opportunity to request UL transmission.

A further apparatus is described. The apparatus may include a processor, memory in electronic communication with the processor, and instructions stored in the memory. The instructions may be operable to cause the processor to receive during an active duration, an indication of an opportunity to request uplink (UL) transmission, identify an opportunity to request UL transmission based at least in part on the indication and transmit on UL resources during the opportunity to request UL transmission.

A non-transitory computer readable medium for wireless communication is described. The non-transitory computer-readable medium may include instructions to cause a processor to receive during an active duration, an indication of an opportunity to request uplink (UL) transmission, identify an opportunity to request UL transmission based at least in part on the indication and transmit on UL resources during the opportunity to request UL transmission.

In some examples of the method, apparatus, or non-transitory computer-readable medium described above, the active duration includes an active duration of a DTX configuration. In some examples of the method, apparatus, or non-transitory computer-readable medium described above, the active duration includes an active duration of a discontinuous reception (DRX) configuration. In some examples of the method, apparatus, or non-transitory computer-readable medium described above, the identifying of the opportunity to request UL transmission may be based at least in part on a network load, a scheduling condition, a latency tolerance, a traffic profile, a gap size request by a UE or any combination thereof. In some examples of the method, apparatus, or non-transitory computer-readable medium described above, the transmitting on the UL resources includes transmitting a request for UL transmission (RULT). In some examples of the method, apparatus, or non-transitory computer-readable medium described above, the transmitting on the UL resources includes transmitting UL data or control at a time instance identified by the indication. In some examples of the method, apparatus, or non-transitory computer-readable medium described above, the DTX configuration may be based at least in part on a discontinuous reception (DRX) configuration, a DTX configuration for one or more neighboring UEs, or both.

Some examples of the method, apparatus, or non-transitory computer-readable medium described above may further include processes, features, means, or instructions for receiving an UL grant during an on duration of the DTX configuration. Some examples of the method, apparatus, or non-transitory computer-readable medium described above may further include processes, features, means, or instructions for transmitting UL data based at least in part on the UL grant, the indication of an opportunity to request UL transmission may be received following the transmission of the UL data.

In some examples of the method, apparatus, or non-transitory computer-readable medium described above, the on duration may be semi-statically determined based at least in part on the DTX configuration. Some examples of the method, apparatus, or non-transitory computer-readable medium described above may further include processes, features, means, or instructions for transmitting a RULT during the on duration, the UL grant may be transmitted based at least in part on the RULT.

Some examples of the method, apparatus, or non-transitory computer-readable medium described above may further include processes, features, means, or instructions for receiving an UL grant during an on duration of the DRX configuration, and transmitting UL data based at least in part on the UL grant, the indication of an opportunity to request UL transmission may be received following the transmission of the UL data.

In some examples of the method, apparatus, or non-transitory computer-readable medium described above, the on duration may be semi-statically determined based at least in part on the DRX configuration. Some examples of the method, apparatus, or non-transitory computer-readable medium described above may further include processes, features, means, or instructions for transmitting a RULT during the on duration, the UL grant may be transmitted based at least in part on the RULT. Some examples of the method, apparatus, or non-transitory computer-readable medium described above may further include processes, features, means, or instructions for transitioning to a short cycle of the DTX configuration based at least in part on the indication of opportunity to request UL transmission. Some examples of the method, apparatus, or non-transitory computer-readable medium described above may further include processes, features, means, or instructions for transitioning from a short cycle of a DTX configuration to a long cycle of a DTX configuration based at least in part on one or more of a determination that an inactivity timer has expired, the UL transmission opportunity indication, or a beginning of a subsequent long cycle of a DTX configuration, or any combination thereof.

Some examples of the method, apparatus, or non-transitory computer-readable medium described above may further include processes, features, means, or instructions for transitioning from a short cycle of a DTX configuration to a long cycle of a DTX configuration based at least in part on one or more of a determination that an inactivity timer has expired, the UL transmission opportunity indication, or a beginning of a subsequent long cycle of a DTX configuration, or any combination thereof.

Some examples of the method, apparatus, or non-transitory computer-readable medium described above may further include processes, features, means, or instructions for determining that no data may be available for transmission during the identified opportunity to request UL transmission. Some examples of the method, apparatus, or non-transitory computer-readable medium described above may further include processes, features, means, or instructions for refraining from transmitting during the identified opportunity based at least in part on the determining. In some examples of the method, apparatus, or non-transitory computer-readable medium described above, the indication of opportunity to request UL transmission includes an opportunity associated with a different radio access technology (RAT).

A method of wireless communication is described. The method may include identifying a transmission opportunity for a UE, transmitting an UL transmission opportunity indication to the UE based at least in part on the identified transmission opportunity and receiving an UL transmission from the UE during the transmission opportunity.

An apparatus for wireless communication is described. The apparatus may include means for identifying a transmission opportunity for a UE, means for transmitting an UL transmission opportunity indication to the UE based at least in part on the identified transmission opportunity and means for receiving an UL transmission from the UE during the transmission opportunity.

A further apparatus is described. The apparatus may include a processor, memory in electronic communication with the processor, and instructions stored in the memory. The instructions may be operable to cause the processor to identify a transmission opportunity for a UE, transmit an UL transmission opportunity indication to the UE based at least in part on the identified transmission opportunity and receive an UL transmission from the UE during the transmission opportunity.

A non-transitory computer readable medium for wireless communication is described. The non-transitory computer-readable medium may include instructions to cause a processor to identify a transmission opportunity for a UE, transmit an UL transmission opportunity indication to the UE based at least in part on the identified transmission opportunity and receive an UL transmission from the UE during the transmission opportunity.

Some examples of the method, apparatus, or non-transitory computer-readable medium described above may further include processes, features, means, or instructions for transmitting an UL grant during an on duration of a DTX configuration established with the UE, the UL transmission may be received based at least in part on the UL grant. In some examples of the method, apparatus, or non-transitory computer-readable medium described above, the on duration may be semi-statically determined based at least in part on the DTX configuration.

Some examples of the method, apparatus, or non-transitory computer-readable medium described above may further include processes, features, means, or instructions for receiving a request for UL transmission (RULT) during the on duration, the transmitting of the UL grant may be based at least in part on the RULT. In some examples of the method, apparatus, or non-transitory computer-readable medium described above, the on duration may be scheduled based at least in part on a DRX configuration, a DTX configuration for one or more neighboring UEs, or both. In some examples of the method, apparatus, or non-transitory computer-readable medium described above, the transmission opportunity may be identified based at least in part on a network load, a scheduling condition, a latency tolerance, a traffic profile, or any combination thereof.

DETAILED DESCRIPTION

Figure 1:
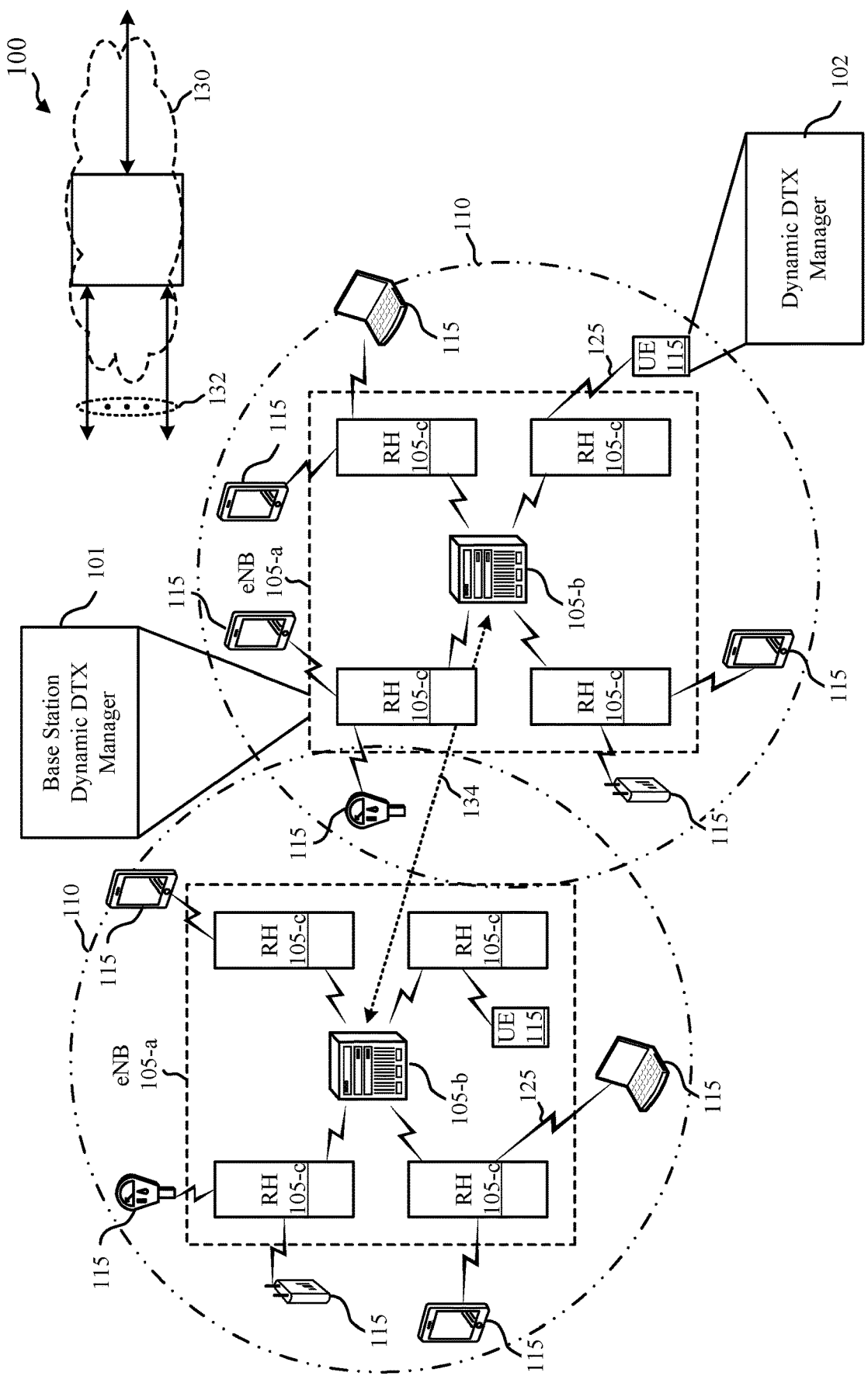
FIG. 1 illustrates an example of a wireless communications system that supports DTX in accordance with aspects of the present disclosure.

A wireless device may use a discontinuous transmission (DTX) cycle to enable the efficient use of battery power and reduce latency for UL transmissions. After a radio resource control (RRC) connection has been established between a base station and a user equipment (UE), a UE may enter a sleep state when not actively communicating. The DTX cycle may determine how frequently the UE wakes up to transmit uplink (UL) data. In some cases, efficient use of battery power and reducing latency for UL transmissions may be utilized by performing dynamic allocation of UE UL TXOPs. The network can enable low latency on UL data by monitoring transmission of a request for uplink transmission (RULT) when UEs are active and not monitoring for RULTs when the UEs are asleep. In some cases, a regularly scheduled DTX on duration or transmission opportunity (e.g., an on duration or transmission opportunity associated with a DTX sleep period) may, additionally or alternatively, be used to schedule a dynamic DTX on duration or transmission opportunity (e.g., an on duration or transmission opportunity associated with a DTX sleep period).

In some examples, a UE may wake up for an on duration of the DRX configuration to receive an UL resource grant for a transmission opportunity (TO). In some cases, the on duration may, additionally or alternatively, be used to transmit a RULT, and the UL grant may be based at least in part on the scheduling request. A UE may, additionally or alternatively, receive a signal from a base station indicating when the next on duration and TO will occur. In some cases, the UE receives, during an active duration, an indication of an opportunity to request UL transmission. The active duration may include a discontinuous transmission DTX configuration or a discontinuous reception DRX configuration. The UE may then identify an opportunity to request UL transmission based at least in part on the indication. The opportunity to request UL transmission may be based at least in part on a network load, a scheduling condition, a latency tolerance, a traffic profile, a gap size request by the UE or any combination thereof. In some cases, the UE may then determine when to transmit data signals (either control data or user data) based at least in part on the time (e.g., opportunity) indicated in the downlink (DL) signal. On durations may be pre-defined (e.g., based at least in part on the DTX configuration) or dynamically allocated. In some cases, the DTX cycle may include both a semi-statically configured on duration for periodic UL transmissions as well as dynamically allocated on durations.

In some cases, an UL DTX may enable a base station to sleep when the UE has no active traffic, while allowing the UEs to transmit data more frequently when it is active. For instance, during a TO, a base station may, additionally or alternatively, indicate a subsequent TO during the same DTX cycle. That is, a TO message may include a parameter specifying an amount of time between receiving the message and the beginning of a subsequent on duration. The UE may then remain in a sleep mode for a period of time before the subsequent data may be transmitted.

In some examples UEs may transmit a gap size request indicating a desired sleep duration between TOs. Base stations may schedule an on duration dynamically based at least in part on the request from UE or other factors (e.g., network load, scheduling delays, latency requirements, traffic profile, etc.). In some cases, the configuration on duration periods or TOs may be scheduled to coincide with DRX active durations. Overlap between DRX and DTX occasions may increase UE power savings. Additionally or alternatively, different UE on durations that are pre-defined and dynamically allocated may be overlapped for network power savings. In some cases, on durations may enable scaling to a large number of Machine-Type-Communication (MTC) devices.

The present DTX-DRX system described herein can enable low latency on UL data by monitoring transmission of a request for uplink transmission (RULT) when UEs are active and not monitoring for RULTs when the UEs are asleep. Further the DTX-DRX system described herein can perform a regularly scheduled DTX on duration or transmission opportunity (e.g., an on duration or transmission opportunity associated with a DTX sleep period) that may, additionally or alternatively, be used to schedule a dynamic DTX on duration or transmission opportunity (e.g., an on duration or transmission opportunity associated with a DTX sleep period).

Aspects of the disclosure are initially described in the context of a wireless communication system. Additionally or alternatively, examples are provided of a DTX configuration using inactivity intervals between active durations. Aspects of the disclosure are further illustrated by and described with reference to apparatus diagrams, system diagrams, and flowcharts that relate to macro and micro DTX.

FIG. 1 illustrates an example of a wireless communication system 100, in accordance with various aspects of the disclosure. The wireless communication system 100 may include network devices 105, UEs 115, and a core network 130. Wireless communication system 100 may support dynamic DTX configurations to enable reduced UL latency and reduced power consumption. For example, wireless communication system 100 may support both regularly scheduled DTX on durations or transmission opportunities (i.e., associated with a DTX sleep period) and dynamic DTX on durations or transmission opportunities (i.e., associated with a DTX sleep period).

The core network 130 may provide user authentication, access authorization, tracking, Internet Protocol (IP) connectivity, and other access, routing, or mobility functions. At least some of the network devices 105 (e.g., network device 105-*a*, which may be an example of an eNB or a base station, or network device 105-*b*, which may be an example of an access node controller (ANC)) may interface with the core network 130 through backhaul links 132 (e.g., S1, S2, etc.) and may perform radio configuration and scheduling for communication with the UEs 115. In various examples, the network devices 105-*b* may communicate, either directly or indirectly (e.g., through core network 130), with each other over backhaul links 134 (e.g., X1, X2, etc.), which may be wired or wireless communication links.

Each network device 105-*b* may, additionally or alternatively, communicate with a number of UEs 115 through a number of other network devices 105-*c*, where network device 105-*c* may be an example of a smart radio head. In alternative configurations, various functions of each network device 105 may be distributed across various network devices 105 (e.g., radio heads and access network controllers) or consolidated into a single network device 105 (e.g., a base station).

A macro cell may cover a relatively large geographic area (e.g., several kilometers in radius) and may allow unrestricted access by UEs 115 with service subscriptions with a network provider. A small cell may include a lower-powered radio head or base station, as compared with a macro cell, and may operate in the same or different frequency band(s) as macro cells. Small cells may include pico cells, femto cells, and micro cells according to various examples. A pico cell may cover a relatively smaller geographic area and may allow unrestricted access by UEs 115 with service subscriptions with a network provider. A micro cell and/or a femto cell, additionally or alternatively, may cover a relatively small geographic area (e.g., a home) and may provide restricted access by UEs 115 having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB or a home eNB. An eNB may support one or multiple (e.g., two, three, four, and the like) cells (e.g., component carriers).

The wireless communication system 100 may support synchronous or asynchronous operation. For synchronous operation, the network devices 105-*a* and/or network devices 105-*c* may have similar frame timing, and transmissions from different network devices 105-*a* and/or network devices 105-*c* may be approximately aligned in time. For asynchronous operation, the network devices 105-*a* and/or network devices 105-*c* may have different frame timings, and transmissions from different network devices 105-*a* and/or network devices 105-*c* may not be aligned in time. The techniques described herein may be used for either synchronous or asynchronous operations.

The communication networks that may accommodate some of the various disclosed examples may be packet-based networks that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may, additionally or alternatively, use Hybrid ARQ (HARD) to provide retransmission at the MAC layer to improve link efficiency. In the control plane, the Radio Resource Control (RRC) protocol layer may provide establishment, configuration, and maintenance of an RRC connection between a UE 115 and a network device 105-*c*, network device 105-*b*, or core network 130 supporting radio bearers for user plane data. At the Physical (PHY) layer, transport channels may be mapped to physical channels.

The UEs 115 may be dispersed throughout the wireless communication system 100, and each UE 115 may be stationary or mobile. A UE 115 may, additionally or alternatively, include or be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, a IoE device, or the like. A UE may be able to communicate with various types of network devices 105-*a*, network devices 105-*c*, base stations, access points, or other network devices, including macro eNBs, small cell eNBs, relay base stations, and the like. A UE may, additionally or alternatively, be able to communicate directly with other UEs (e.g., using a peer-to-peer (P2P) protocol).

The communication links 125 shown in wireless communication system 100 may include uplink (UL) channels from a UE 115 to a network device 105-*c*, and/or downlink (DL) channels, from a network device 105-*c* to a UE 115. The downlink channels may, additionally or alternatively, be called forward link channels, while the uplink channels may, additionally or alternatively, be called reverse link channels. Control information and data may be multiplexed on an uplink channel or downlink according to various techniques. Control information and data may be multiplexed on a downlink channel, for example, using Time Division Multiplexing (TDM) techniques, Frequency Division Multiplexing (FDM) techniques, or hybrid TDM-FDM techniques. In some examples, the control information transmitted during an active duration of a downlink channel may be distributed between different control regions in a cascaded manner (e.g., between a common control region and one or more UE-specific control regions).

One or more of network devices 105 may include a base station dynamic DTX manager 101, which may provide DTX configurations that include a combination of active durations and inactivity intervals. In some examples, the base station dynamic DTX manager 101 may transmit an UL grant during an on duration of a DTX configuration established with a UE, receive UL data during a first transmission opportunity based at least in part on the UL grant, and transmit an indication of a second transmission opportunity. UEs 115 may include a dynamic DTX manager 102, which may receive an UL grant during an on duration of a DTX configuration, transmit UL data during a first transmission opportunity based at least in part on the UL grant, and receive an indication of a second transmission opportunity.

Wireless communication system 100 may support operation on multiple cells or carriers, a feature which may be referred to as carrier aggregation (CA) or multi-carrier operation. A carrier may, additionally or alternatively, be referred to as a component carrier (CC), a layer, a channel, etc. The terms "carrier," "component carrier," "cell," and "channel" may be used interchangeably herein. A UE 115 may be configured with multiple downlink CCs and one or more uplink CCs for carrier aggregation. Carrier aggregation may be used with both FDD and Time Division Duplex (TDD) component carriers.

In some cases, a wireless communications system may utilize one or more enhanced component carrier(s) (ECC). An ECC may be characterized by one or more features including: flexible bandwidth, variable length TTIs, and modified control channel configuration. In some cases, an ECC may be associated with a carrier aggregation configuration or a dual connectivity configuration (i.e., when multiple serving cells have a suboptimal backhaul link). An ECC may, additionally or alternatively, be configured for use in unlicensed spectrum or shared spectrum (where more than one operator is licensed to use the spectrum). An ECC characterized by flexible bandwidth may include one or more segments that may be utilized by UEs 115 that may not be capable of monitoring the whole bandwidth or prefer to use a limited bandwidth (e.g., to conserve power).

In some cases, an ECC may utilize a variable transmission time interval (TTI) length, which may include use of a reduced or variable symbol duration. In some cases the symbol duration may remain the same, but each symbol may represent a distinct TTI. In some cases an ECC may include multiple hierarchical layers associated with the different TTI lengths. For example, TTIs at one hierarchical layer may correspond to uniform 1 ms subframes, whereas in a second layer, variable length TTIs may correspond to bursts of short duration symbol periods. In some cases, a shorter symbol duration may, additionally or alternatively, be associated with increased subcarrier spacing.

Flexible bandwidth and variable TTIs may be associated with a modified control channel configuration (e.g., an ECC may utilize an ePDCCH for DL control information). For example, one or more control channels of an ECC may utilize FDM scheduling to accommodate flexible bandwidth use. Other control channel modifications include the use of additional control channels (e.g., for eMBMS scheduling, or to indicate the length of variable length UL and DL burst(s), or control channels transmitted at different intervals. An ECC may, additionally or alternatively, include modified or additional HARQ related control information.

In some cases, a UE 115 may monitor one of the communication links 125 continuously for an indication that the UE 115 may receive data. In other cases (e.g., to conserve power and extend battery life) a UE 115 may be configured with a DRX cycle. A DRX cycle comprises of an "on duration" when the UE 115 may monitor for control information (e.g., on PDCCH) and a "DRX sleep period" when the UE 115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle and continuous reception may be controlled by an internal timer or by messaging from a network device 105.

A UE 115 may receive scheduling messages on physical downlink control channel (PDCCH) during the on duration. While monitoring PDCCH for a scheduling message, the UE 115 may initiate a "DRX Inactivity Timer". If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer". When the DRX Short Cycle Timer expires, the UE 115 may resume a long DRX cycle.

In some examples, UE 115 may transition from a first DTX configuration to a second DTX configuration, the transition may occur upon data transmission by the UE 115 (i.e., when the UE 115 receives a grant during the on duration of the first DTX configuration and starts transmitting data) or upon explicit indication from the network (e.g. based at least in part on DL data arrival at the network). Additionally or alternatively, UE 115 may, additionally or alternatively, transition from the second DTX configuration to the first DTX configuration, the transition may occur upon the expiration of an inactivity timer or the receipt of an indication from the network (e.g. based at least in part on a duration of inactivity).

According to the present disclosure, a wireless device such as a UE 115 may establish an UL DTX configuration. An UL grant may be received from a network device 105 during an on duration of the DTX configuration, and UE 115 may transmit data during a transmission opportunity based at least in part on the UL grant. In some cases, the UE 115 may transmit a request for UL transmission (RULT) during the on duration, and the grant may be based at least in part on the RULT. In some cases, the UE 115 may, additionally or alternatively, receive an indication of a subsequent transmission opportunity. Prior to the subsequent transmission opportunity a dynamic on duration may be used to transmit a RULT or receive an UL grant. The UE 115 may then transmit during the additional transmission opportunity if UL data is available.

Figure 2:
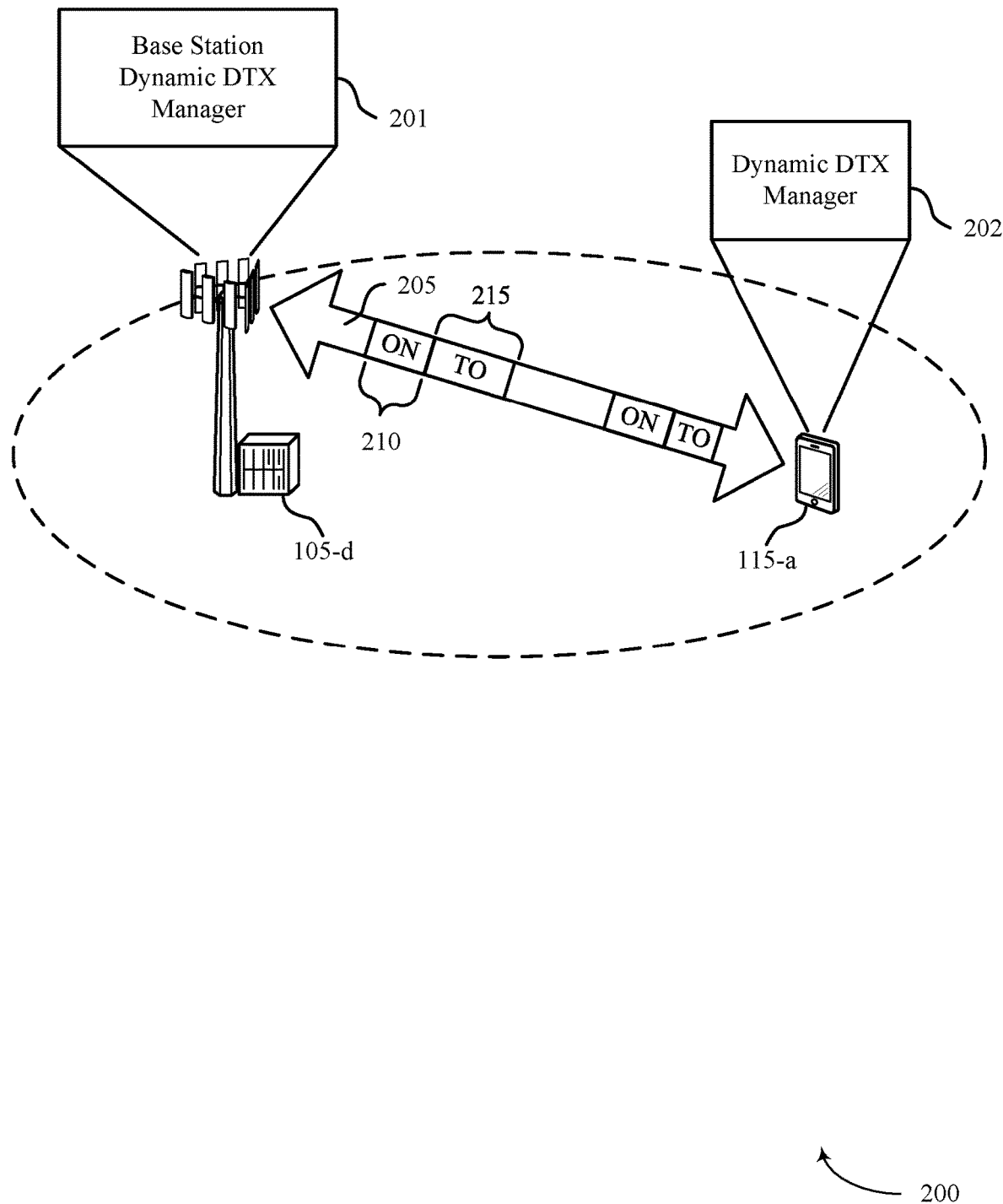
FIG. 2 illustrates an example of a wireless communications system that supports DTX in accordance with aspects of the present disclosure.

FIG. 2 illustrates an example of a wireless communications system 200 that supports macro and micro DTX. Wireless communications system 200 may include network device 105-d, and UE 115-a, which may be examples of the corresponding devices described with reference to FIG. 1. Wireless communications system 200 may support dynamic DTX configurations to allow for efficient power use. For example, wireless communication system 100 may support both regularly scheduled DTX on durations or transmission opportunities (i.e., associated with a DTX sleep period) and dynamic DTX on durations or transmission opportunities (i.e., associated with a DTX sleep period).

In wireless communications system 200, a wireless device may use a DTX cycle to enable the efficient use of battery power. After an RRC connection 205 has been established between network device 105-d and UE 115-a, UE 115-a may enter a sleep state when not actively communicating. The DTX cycle may determine how frequently UE 115-a wakes up to transmit UL data. That is, a DTX configuration may include periodic on durations 210, during which UE 115-a may wake up to receive an UL grant. In some cases, prior to receiving the grant, UE 115-a may use the on duration to transmit a RULT, and the grant may be based at least in part on the RULT. A transmission opportunity 215 may be associated with each on duration 210.

While an on duration may refer to an initial monitoring period, the total duration that UE 115-a is awake may be referred to as the active duration. The active duration may include the on duration of the DTX cycle and the time that UE 115-a is actively transmitting data. In some cases, the active duration may, additionally or alternatively, include a waiting period while an inactivity timer is running, and time spent waiting for an acknowledgement from transmitted messages. The minimum active duration may be equal to the on duration, and there may be no maximum active duration. In some cases, a DTX may be configured on a per UE basis (as opposed to on a radio bearer basis). That is, a single DTX configuration may be applied to UE 115-a at any time (e.g., all the time, or a particular time).

Some communications may take place independent of a DTX configuration. For example, UE 115-*a* may use the first available random access channel (RACH) opportunity to send an UL measurement report. Hybrid automatic repeat request (HARD) operations related to data transmission may, additionally or alternatively, be independent of DTX operation. Thus, UE 115-*a* may wake up to monitor a control channel for any retransmissions and/or acknowledgment/negative acknowledgement (ACK/NACK) signaling regardless of the DRX configuration. In some cases, a timer may be used to limit the time UE 115-*a* stays awake for a retransmission. In some examples, new transmissions may take place during the active duration, so that when UE 115-*a* is waiting for a retransmission, it may not have to stay awake during the round trip time (RTT).

In some DTX configurations, UE 115-*a* may be further configured with an on duration timer, during which UE 115-*a* may monitor for control messages that include possible data allocations. Some DTX configurations may enable periodic channel quality indicator (CQI) reports to be sent by UE 115-*a* during the active duration. In some cases, RRC signaling may be used to coordinate periodic CQI reports so that they are sent during the on duration. Additionally, a timer for a timing advance group (TAG) in UE 115-*a* may be used to enable UE 115-*a* to obtain a timing advance for each TAG.

If UE 115-*a* does not have UL data to transmit during a transmission opportunity, it may re-enter DTX sleep (if allowed by the DTX configuration). The ability to re-enter sleep may, additionally or alternatively, apply to the subframes where UE 115-*a* has been allocated predefined resources. In some cases, UE 115-*a* may stay awake until the expiration of the inactivity timer, until it no longer has UL data to transmit or until a MAC control message tells UE 115-*a* to re-enter DTX sleep.

The process that UE 115-*a* follows for re-entering DTX may have different configurations. For example, if a short DTX cycle is configured, UE 115-*a* may first use the short DTX cycle and change to a long DTX cycle following a relatively long period of inactivity. In other cases, UE 115-*a* may follow the long DTX cycle directly.

A network may ensure that it is aware of whether UE 115-*a* remains within a coverage area by requesting that UE 115-*a* send periodic signals to the network. In wireless networks using carrier aggregation (CA), if UE 115-*a* is configured with only one serving cell (i.e., a primary cell (PCell)) the DTX associated with CA-enabled wireless systems may be used to determine the cycle for other component carriers. For example, the same DTX operation may be applied to all configured and activated serving cells. In networks using dual connectivity (DC), separate DTX configurations can be applied to a master cell group (MCG) and a secondary cell group (SCG), and group specific DTX operation may be applied to all configured and activated serving cells in the same cell group.

UE 115-*a* may engage in both UL and DL communication with network device 105-*d*. For example, UL transmission opportunities may include on durations and be scheduled according to a DTX configuration, and DL transmissions may be scheduled according to a DRX configuration. The DRX and DTX configurations may be coordinated to improve energy efficiency or based at least in part on traffic load considerations.

In some cases, The DTX configuration may specify a RULT periodicity. For example, RULT transmissions may be allowed on subframes associated with a DTX on duration 210 (e.g., predefined on durations). UEs 115 may follow RULT periodicity even during periods of data activity, which may result in reduced power consumption and increased latency for UL transmissions.

For example, UE 115-*a* may wait for an on duration 210 to transmit a RULT. UE 115-*a* may then receive a grant for a subsequent data transmission during a transmission opportunity 215. For example, UE 115-*a* may receive a DL signal from network device 105-*d* indicating when the next on duration 210 is scheduled. UE 115-*a* may then determine when to transmit data signals (either control data or user data) based at least in part on the time indicated in the DL signal. On durations 210 may be pre-defined (e.g., based at least in part on DTX cycle) and/or dynamically allocated. In some cases, the DTX cycle may include both a semi-statically configured on duration for periodic UL transmissions as well as dynamically allocated on durations.

During an on duration when UE 115-*a* is scheduled to transmit data, network device 105-*d* may, additionally or alternatively, indicate a subsequent on duration 210 during the same DTX cycle or that overlaps with a subsequent DRX cycle. That is, a DTX on duration message may include a parameter specifying an amount of time between receiving the message and the beginning of a subsequent on duration. UE 115-*a* may then remain in a sleep mode for a period of time before the subsequent data is transmitted.

In some examples, UE 115-*a* may transmit a gap size request indicating a desired sleep duration between on durations 210. Network device 105-*d* may then schedule an on duration 210 dynamically based at least in part on the signal from UE 115-*a* or other factors (e.g., network load, scheduling delays, latency requirements, traffic profile, etc.). In some cases, the DTX configuration and the on duration periods may be scheduled to coincide with DRX active durations. Overlap between DRX and DTX occasions may increase UE 115-*a* power savings. Additionally or alternatively, different UE 115-*a* on durations 210 that are pre-defined and dynamically allocated may be overlapped for network power savings. In some cases, on durations 210 may enable scaling to a large number of Machine-Type-Communication (MTC) devices.

Figure 3:
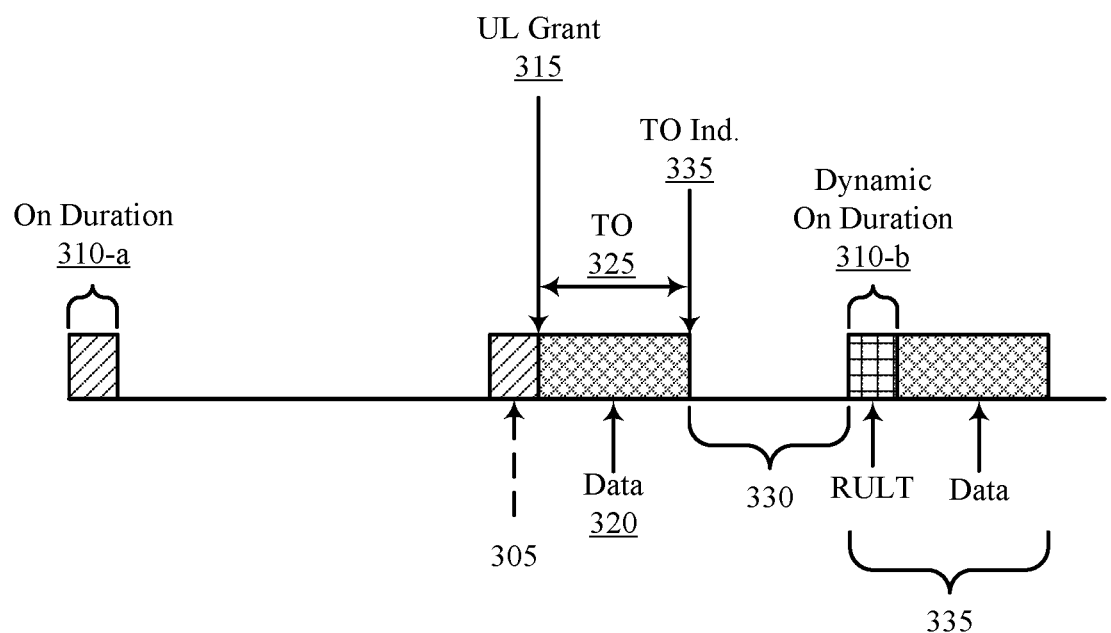
FIG. 3 illustrates an example of a DTX configuration that supports predefined and dynamic on durations in accordance with aspects of the present disclosure.

FIG. 3 illustrates an example of a DTX configuration 300 that supports macro and micro DTX. In some cases, DTX configuration 300 may represent aspects of techniques performed by a UE 115 or network device 105 as described with reference to FIGS. 1-2. DTX configuration 300 may be an example of an inactivity interval between active durations of a DTX cycle, the active duration may include an initial on duration, an indication of an opportunity to request UL transmission (i.e., a transmission opportunity), or both.

After an RRC connection is established between a UE 115 and a network device 105, the UE 115 may enter a DTX configuration 300. A UE 115 may wake up during an on duration 310-*a* of DTX configuration 300 and, if no UL transmissions are forthcoming from the UE 115, the UE 115 may go to sleep until a subsequent on duration 310 (i.e., during a DTX sleep period). In some examples, at the subsequent on duration 310 the UE 115 may have data to transmit, and may transmit a RULT 305 to a network device 105. A network device 105 may then transmit an UL grant 315 indicating the UE 115 may transmit. In some cases, a network device 105 may transmit the UL grant 315 without receiving a RULT 305. The UE 115 may subsequently transmit data 320 during the transmission opportunity 325. Following the transmission opportunity 325, the UE 115 may enter an inactivity interval 300 (i.e., a DTX sleep period). In some cases, the data 320 may include a gap size request related to the inactivity interval 330, during which the UE 115 may not transmit following the completion of the transmission opportunity 325.

A network device 105 may transmit a second transmission opportunity indication (e.g., 335) to the UE 115, indicating that a dynamic on duration 310-b may be available to the UE 115 after the inactivity interval 330. In some examples, the presence or time period of the dynamic on duration 310-b may be determined based at least in part on a network load, a scheduling condition, a latency tolerance, a traffic profile, a gap size request by the UE or any combination thereof.

In some cases, UE 115 may transmit a RULT during the dynamic on duration 310-b following the inactivity interval 330. Network device 105 may then transmit an UL grant, indicating the UE 115 may transmit. The UE 115 may subsequently transmit data 320 during a subsequent transmission opportunity. In some cases, an active duration 335 of DTX configuration 300 may include an on duration 310, an indication of an opportunity to request UL transmission (i.e., a transmission opportunity 325), or both.

In some examples, UE 115 may not transmit a signal to network device 105 indicating a desired transmission time period. Network device 105 may then transmit a DTX message to UE 115 indicating a pre-defined on duration schedule. In some cases, if a UE 115 does not have data available for transmission, it may not send a RULT during an on duration 210 and remain in a state of DTX.

Figure 4:
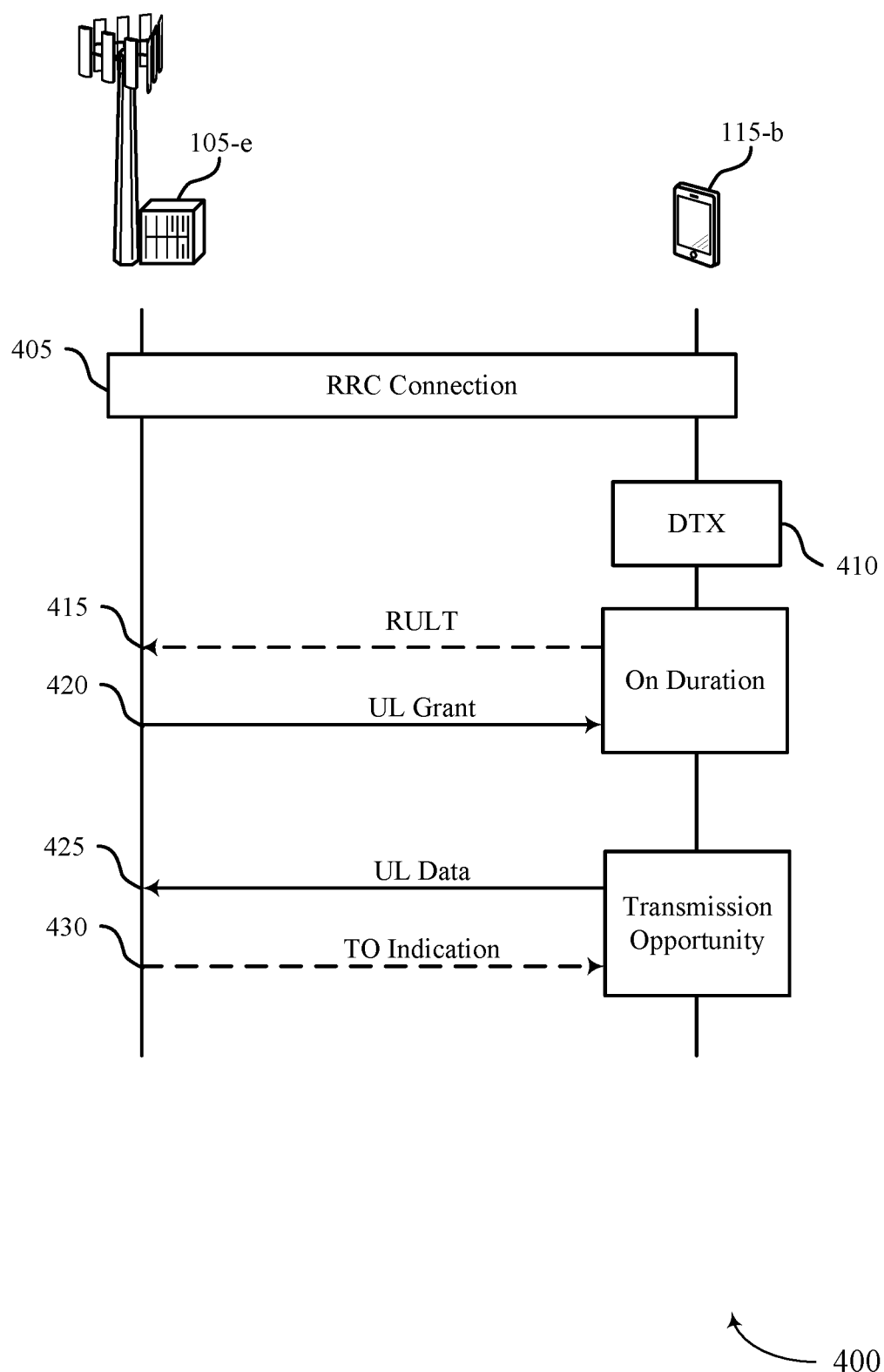
FIG. 4 illustrates an example of a process flow in a system that supports DTX configurations with predefined and dynamic on durations in accordance with aspects of the present disclosure.

FIG. 4 illustrates an example of a process flow 400 for macro and micro DRX in accordance with various aspects of the present disclosure. Process flow 400 may include network device 105-e and UE 115-a, which may be examples of the corresponding devices described with reference to FIG. 1-2.

At block 405, network device 105-e and UE 115-b may establish an RRC connection. A DTX configuration may be configured as part of the RRC connection configuration. At block 410, UE 115-b may begin a DTX cycle.

In some cases, at block 415, UE 115-b may transmit a RULT during the on duration of the DTX configuration, the on duration may be semi-statically determined based at least in part on the DTX configuration. In some cases, UE 115-b may receive an indication of a timing of the on duration, transmitting the RULT is based at least in part on the indication of the timing of the on duration. Additionally or alternatively, the on duration may be configured based at least in part on a DRX configuration, a DTX configuration for one or more neighboring UEs, or both.

At block 420, network device 105-e may transmit, and UE 115-b may receive, an UL grant during the on duration. In some examples, the UL grant may be an indication of opportunity to request UL transmission for an opportunity associated with a different radio access technology (RAT). For example, the UL grant or the indication includes an indication of a third transmission opportunity, the third transmission opportunity is associated with a different radio access technology (RAT) from the first transmission opportunity and the second transmission opportunity. At block 425, UE 115-b may transmit UL data during a first transmission opportunity based at least in part on the UL grant (e.g., indication of the opportunity to request UL transmission).

At block 430, network device may transmit, and UE 115-b may receive an indication of a second transmission opportunity (i.e., following a DTX sleep period). As a result, UE 115-b may transmit a second RULT for the second transmission opportunity based at least in part on the indication, receive a second UL grant (e.g., indication of the opportunity to request UL transmission) based at least in part on the second RULT, and transmit additional UL data based at least in part on the second UL grant (not shown). In some examples, UE 115-b may determine that no data is available for transmission during the second transmission opportunity and refrain from transmitting.

In other examples, network device 105-e may determine that no RULT has been received for the second transmission opportunity and refrain from transmitting a second UL grant based at least in part on the determination. In some cases, the indication may include a short DTX period, the short DTX period is shorter than a DTX period of the DTX configuration. In some examples, UE 115-b may, additionally or alternatively, transmit a gap size request, the second transmission opportunity is determined based at least in part on the gap size request. In some cases, the second transmission opportunity may be determined based at least in part on a network load, a scheduling condition, a latency tolerance, a traffic profile, a gap size request by the UE or any combination thereof.

Figure 5:
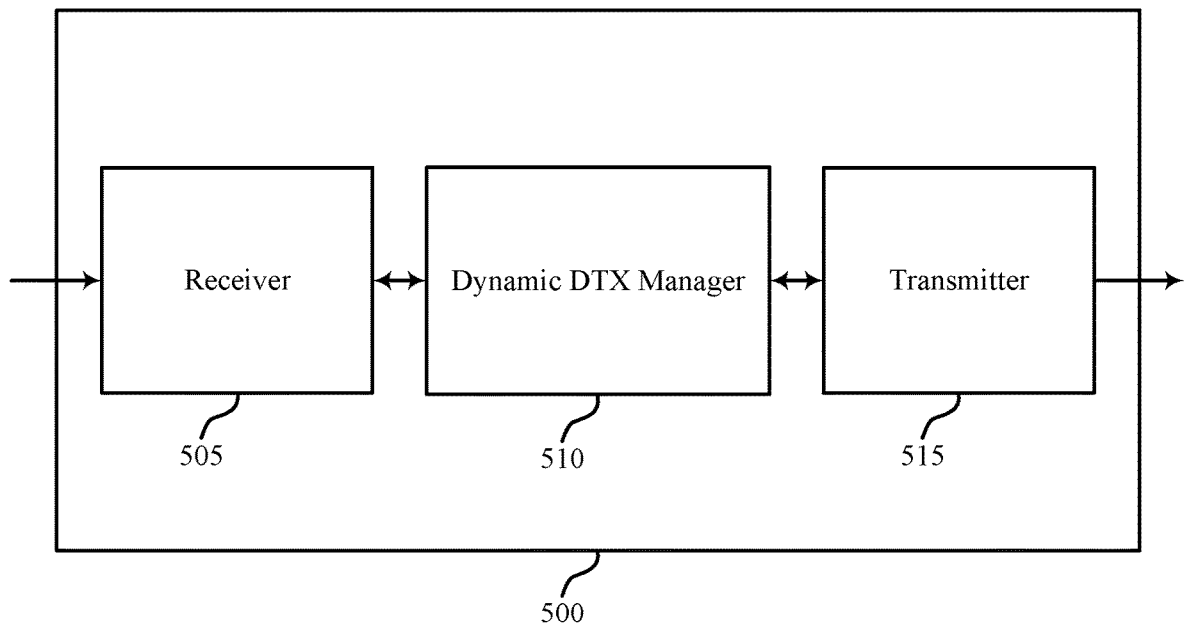
FIGS. 5 through 7 show block diagrams of a wireless device that supports DTX configurations with predefined and dynamic on durations in accordance with aspects of the present disclosure.

FIG. 5 shows a block diagram of a wireless device 500 that supports macro and micro DTX in accordance with various aspects of the present disclosure. Wireless device 500 may be an example of aspects of a UE 115 described with reference to FIGS. 1 and 2. Wireless device 500 may include receiver 505, dynamic DTX manager 510 and transmitter 515. Wireless device 500 may, additionally or alternatively, include a processor. Each of these components may be in communication with each other.

The receiver 505 may receive information such as packets, user data, or control information associated with various information channels (e.g., control channels, data channels, and information related to macro and micro DTX, etc.). Information may be passed on to other components of the device. The receiver 505 may be an example of aspects of the transceiver 825 described with reference to FIG. 8.

The dynamic DTX manager 510 may receive during an active duration, an indication of an opportunity to request uplink (UL) transmission, identify an opportunity to request UL transmission based at least in part on the indication, and transmit on an UL resource during the opportunity to request UL transmission. The dynamic DTX manager 510 may, additionally or alternatively, be an example of aspects of the dynamic DTX manager 805 described with reference to FIG. 8.

The transmitter 515 may transmit signals received from other components of wireless device 500. In some examples, the transmitter 515 may be collocated with a receiver in a transceiver module. For example, the transmitter 515 may be an example of aspects of the transceiver 825 described with reference to FIG. 8. The transmitter 515 may include a single antenna, or it may include a plurality of antennas.

Figure 6:
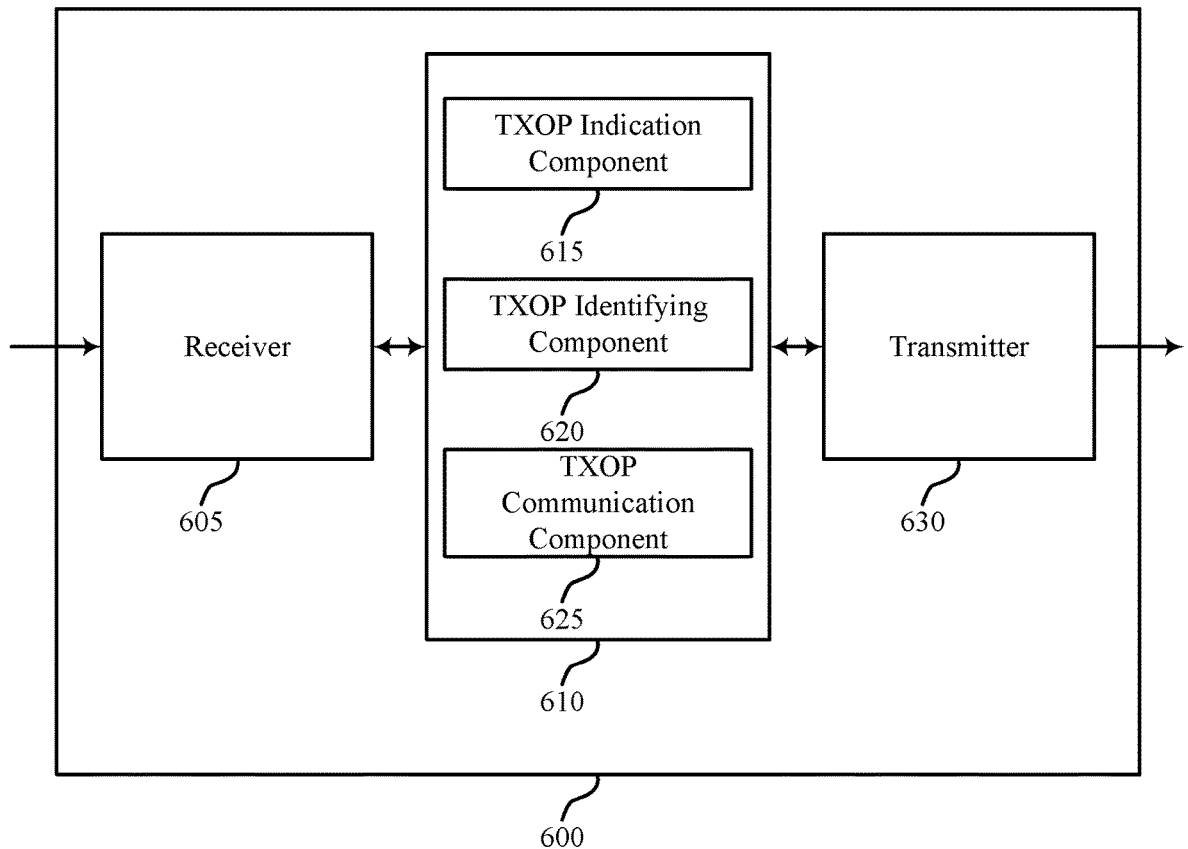

FIG. 6 shows a block diagram of a wireless device 600 that supports macro and micro DTX in accordance with various aspects of the present disclosure. Wireless device 600 may be an example of aspects of a wireless device 500 or a UE 115 described with reference to FIGS. 1, 2 and 5. Wireless device 600 may include receiver 605, dynamic DTX manager 610 and transmitter 630. Wireless device 600 may, additionally or alternatively, include a processor. Each of these components may be in communication with each other.

The receiver 605 may receive information which may be passed on to other components of the device. The receiver 605 may, additionally or alternatively, perform the functions described with reference to the receiver 505 of FIG. 5. The receiver 605 may be an example of aspects of the transceiver 825 described with reference to FIG. 8.

The dynamic DTX manager 610 may be an example of aspects of dynamic DTX manager 510 described with reference to FIG. 5. The dynamic DTX manager 610 may include transmission opportunity (TXOP) indication component 615, TXOP identifying component 620 and TXOP communication component 625. The dynamic DTX manager 610 may be an example of aspects of the dynamic DTX manager 805 described with reference to FIG. 8.

The TXOP indication component 615 may receive a second UL transmission opportunity indication during the transmission opportunity, the second UL transmission opportunity indication corresponds to a second transmission opportunity, and receive an UL transmission opportunity indication. In some cases, the UL transmission opportunity indication identifies the UL resource.

The TXOP identifying component 620 may identify a transmission opportunity based at least in part on the UL transmission opportunity indication. In some cases, the second transmission opportunity is determined based at least in part on a network load, a scheduling condition, a latency tolerance, a traffic profile, or any combination thereof.

The TXOP communication component 625 may communicate or refrain from transmitting during a second transmission opportunity, for example, such as transmitting on an UL resource during the transmission opportunity.

The transmitter 630 may transmit signals received from other components of wireless device 600. In some examples, the transmitter 630 may be collocated with a receiver in a transceiver module. For example, the transmitter 630 may be an example of aspects of the transceiver 825 described with reference to FIG. 8. The transmitter 630 may utilize a single antenna, or it may utilize a plurality of antennas.

Figure 7:
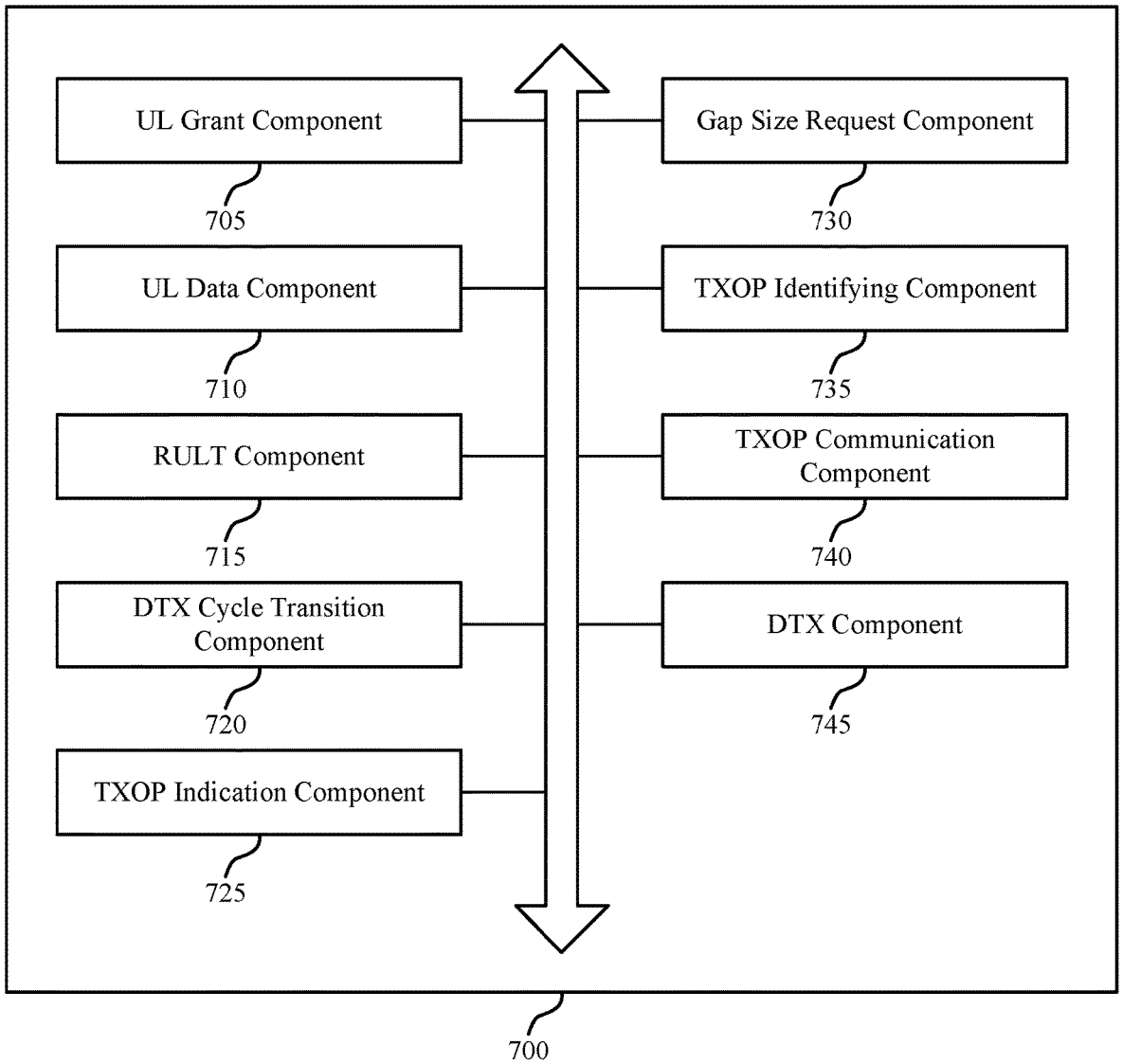

FIG. 7 shows a block diagram of a dynamic DTX manager 700 which may be an example of the corresponding component of wireless device 500 or wireless device 600. That is, dynamic DTX manager 700 may be an example of aspects of dynamic DTX manager 510 or dynamic DTX manager 610 described with reference to FIGS. 5 and 6. The dynamic DTX manager 700 may, additionally or alternatively, be an example of aspects of the dynamic DTX manager 805 described with reference to FIG. 8.

The dynamic DTX manager 700 may include UL grant component 705, UL data component 710, RULT component 715, DTX cycle transition component 720, TXOP indication component 725, gap size request component 730, TXOP identifying component 735, TXOP communication component 740 and DTX component 745. Each of these modules may communicate, directly or indirectly, with one another (e.g., via one or more buses).

The UL grant component 705 may receive an UL grant during an on duration of the DTX configuration, and receive a second UL grant based at least in part on the second RULT, UL data is transmitted based at least in part on the second UL grant. In some cases, the on duration is semi-statically determined based at least in part on the DTX configuration. In some cases, an UL grant or the UL transmission opportunity indication comprises an indication of a second transmission opportunity, the second transmission opportunity is associated with a different RAT than the transmission opportunity.

The UL data component 710 may transmit UL data based at least in part on the UL grant, the UL transmission opportunity indication is received following the transmission of the UL data, and determine that no data is available for transmission during the second transmission opportunity.

The RULT component 715 may transmit a RULT during the on duration. In some cases, the UL grant is transmitted based at least in part on the RULT. In further cases, the RULT component 715 may transmit a second RULT based at least in part on the UL transmission opportunity indication.

The DTX cycle transition component 720 may transition from a long cycle of the DTX configuration to a short cycle of the DTX configuration based at least in part on the UL grant, transition from a long cycle of a DTX configuration to a short cycle of a DTX configuration based at least in part on the UL transmission opportunity indication, and transition from a short cycle of a DTX configuration to a long cycle of a DTX configuration based at least in part on one or more of a determination that an inactivity timer has expired, the UL transmission opportunity indication, or a beginning of a subsequent long cycle of a DTX configuration.

The TXOP indication component 725 may receive a second UL transmission opportunity indication during the transmission opportunity, the second UL transmission opportunity indication corresponds to a second transmission opportunity, and receive an UL transmission opportunity indication.

The gap size request component 730 may transmit a gap size request, the UL transmission opportunity indication is transmitted based at least in part on the gap size request.

The TXOP identifying component 735 may identify a transmission opportunity based at least in part on the UL transmission opportunity indication. The TXOP communication component 740 may communicate or refrain from transmitting during a transmission opportunity. For example, TXOP communication component 740 may transmit on an UL resource during the transmission opportunity.

The DTX component 745 may receive an UL transmission opportunity indicated based at least in part on a DTX configuration. In some cases, the DTX configuration may be based at least in part on a DRX configuration, a DTX configuration for one or more neighboring UEs, or both. In some cases, the UL transmission opportunity indication is received during an active duration of a DRX configuration. In some cases, the UL transmission opportunity indication is received during an active duration of a DTX configuration.

Figure 8:
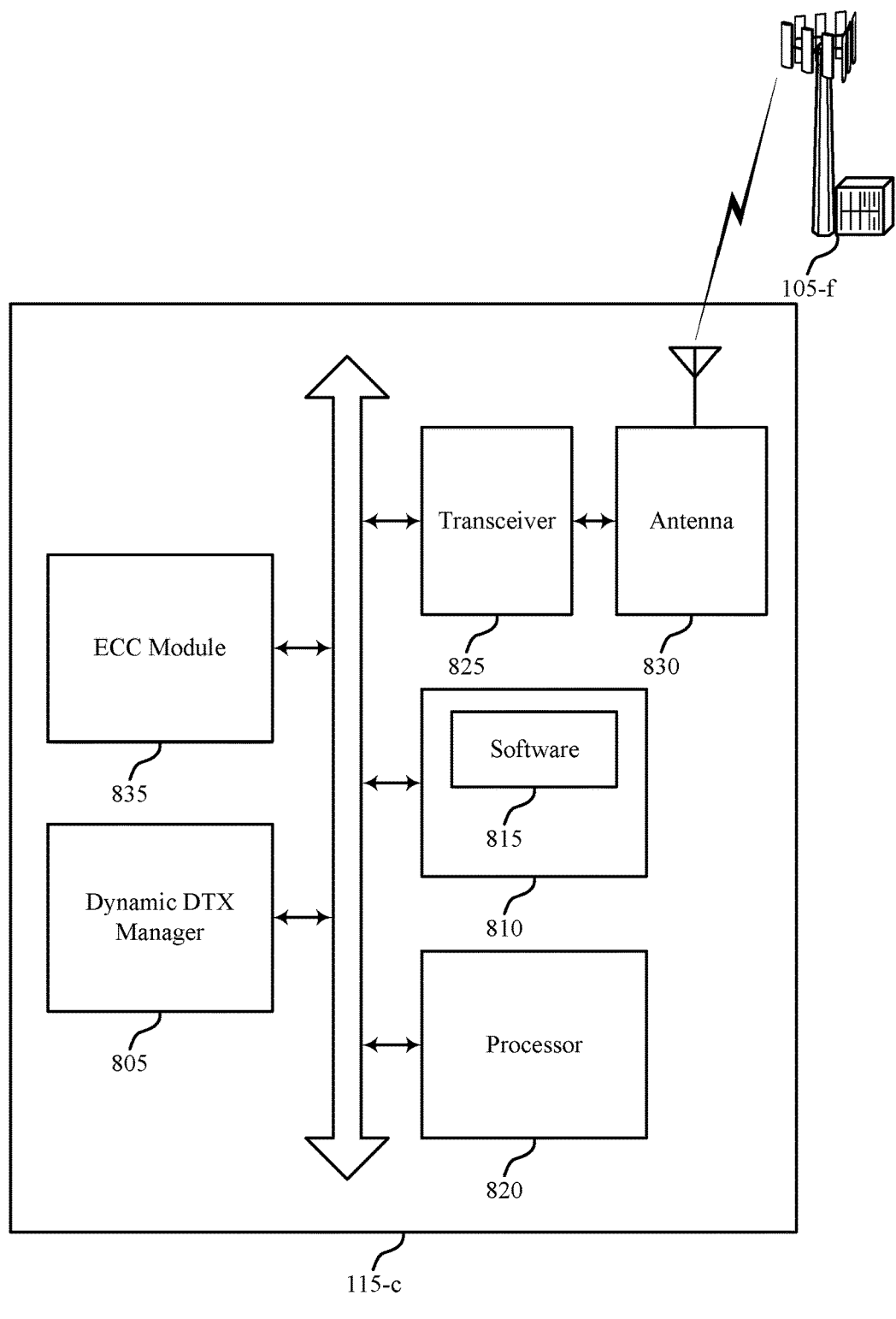
FIG. 8 illustrates a block diagram of a system including a UE that supports macro and micro DTX in accordance with aspects of the present disclosure.

FIG. 8 shows a diagram of a system 800 including a device that supports macro and micro DTX in accordance with various aspects of the present disclosure. For example, system 800 may include UE 115-c, which may be an example of a wireless device 500, a wireless device 600, or a UE 115 as described with reference to FIGS. 1, 2 and 5 through 7.

UE 115-c may, additionally or alternatively, include dynamic DTX manager 805, memory 810, processor 820, transceiver 825, antenna 830 and ECC module 835. Each of these modules may communicate, directly or indirectly, with one another (e.g., via one or more buses). The dynamic DTX manager 805 may be an example of a dynamic DTX manager as described with reference to FIGS. 5 through 7.

The memory 810 may include random access memory (RAM) and read only memory (ROM). The memory 810 may store computer-readable, computer-executable software including instructions that, when executed, cause the processor to perform various functions described herein (e.g., macro and micro DTX, etc.). In some cases, the software 815 may not be directly executable by the processor but may cause a computer (e.g., when compiled and executed) to perform functions described herein. The processor 820 may include an intelligent hardware device, (e.g., a central processing unit (CPU), a microcontroller, an application specific integrated circuit (ASIC), etc.)

The transceiver 825 may communicate bi-directionally, via one or more antennas, wired, or wireless links, with one or more networks, as described above. For example, the transceiver 825 may communicate bi-directionally with a network device 105 or a UE 115. The transceiver 825 may, additionally or alternatively, include a modem to modulate the packets and provide the modulated packets to the antennas for transmission, and to demodulate packets received from the antennas. In some cases, the wireless device may include a single antenna 830. However, in some cases the device may have more than one antenna 830, which may be capable of concurrently transmitting or receiving multiple wireless transmissions.

The ECC module 835 may enable operations using ECCs such as communication using shared or unlicensed spectrum, using reduced TTIs or subframe durations, or using a large number of CCs.

Figure 9:
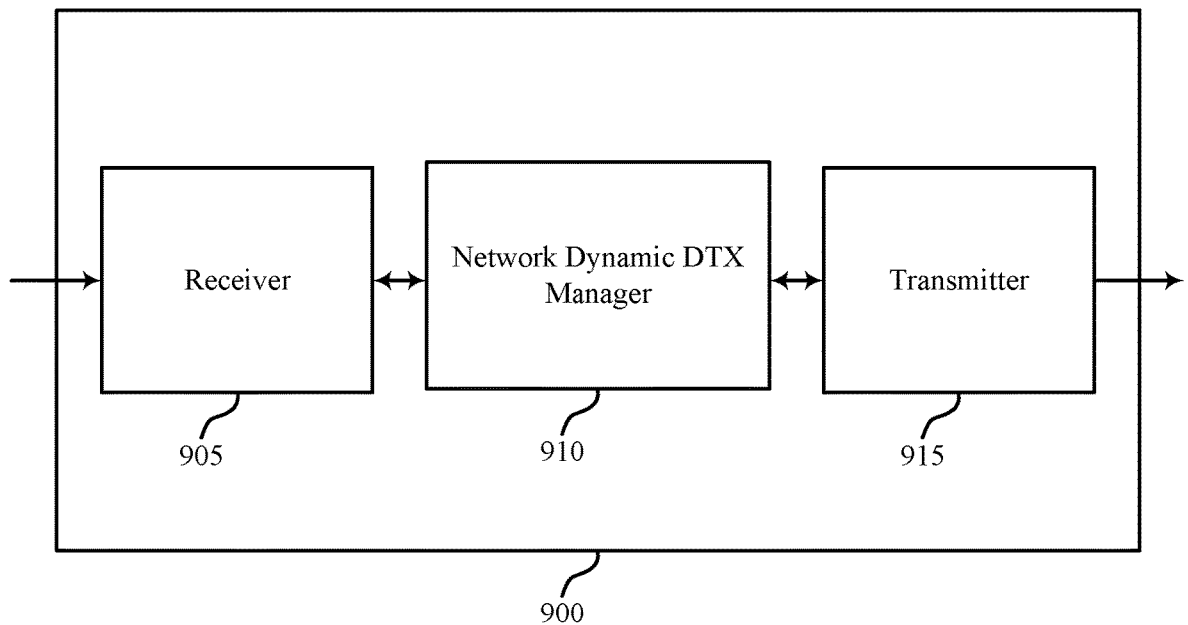
FIGS. 9 through 11 show block diagrams of a wireless device that supports macro and micro DTX in accordance with aspects of the present disclosure.

FIG. 9 shows a block diagram of a wireless device 900 that supports macro and micro DTX in accordance with various aspects of the present disclosure. Wireless device 900 may be an example of aspects of a network device 105 described with reference to FIGS. 1 and 2. Wireless device 900 may include receiver 905, network dynamic DTX manager 910 and transmitter 915. Wireless device 900 may, additionally or alternatively, include a processor. Each of these components may be in communication with each other.

The receiver 905 may receive information such as packets, user data, or control information associated with various information channels (e.g., control channels, data channels, and information related to macro and micro DTX, etc.). Information may be passed on to other components of the device. The receiver 905 may be an example of aspects of the transceiver 1225 described with reference to FIG. 12.

The network dynamic DTX manager 910 may identify a transmission opportunity for a UE, transmit an UL transmission opportunity indication to the UE based at least in part on the identified transmission opportunity, and receive an UL transmission from the UE during the transmission opportunity. The network dynamic DTX manager 910 may, additionally or alternatively, be an example of aspects of the network dynamic DTX manager 1205 described with reference to FIG. 12.

The transmitter 915 may transmit signals received from other components of wireless device 900. In some examples, the transmitter 915 may be collocated with a receiver in a transceiver module. For example, the transmitter 915 may be an example of aspects of the transceiver 1225 described with reference to FIG. 12. The transmitter 915 may include a single antenna, or it may include a plurality of antennas.

Figure 10:
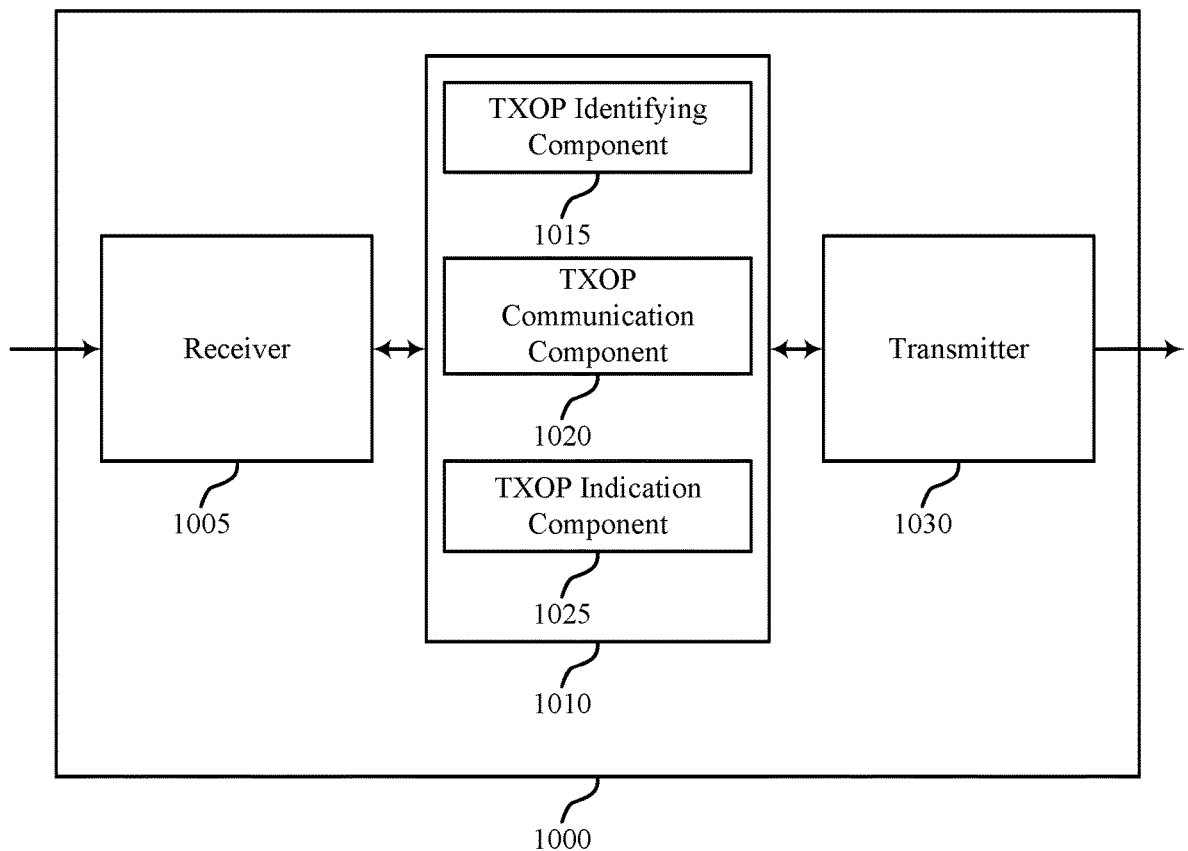

FIG. 10 shows a block diagram of a wireless device 1000 that supports macro and micro DTX in accordance with various aspects of the present disclosure. Wireless device 1000 may be an example of aspects of a wireless device 900 or a network device 105 described with reference to FIGS. 1, 2 and 9. Wireless device 1000 may include receiver 1005, network dynamic DTX manager 1010 and transmitter 1030. Wireless device 1000 may, additionally or alternatively, include a processor. Each of these components may be in communication with each other.

The receiver 1005 may receive information which may be passed on to other components of the device. The receiver 1005 may, additionally or alternatively, perform the functions described with reference to the receiver 905 of FIG. 9. The receiver 1005 may be an example of aspects of the transceiver 1225 described with reference to FIG. 12.

The network dynamic DTX manager 1010 may be an example of aspects of network dynamic DTX manager 910 described with reference to FIG. 9. The network dynamic DTX manager 1010 may include TXOP identifying component 1015, TXOP communication component 1020 and TXOP indication component 1025. The network dynamic DTX manager 1010 may be an example of aspects of the network dynamic DTX manager 1205 described with reference to FIG. 12.

The TXOP identifying component 1015 may identify a transmission opportunity for a UE. In some cases, the transmission opportunity is identified based at least in part on a network load, a scheduling condition, a latency tolerance, a traffic profile, or any combination thereof.

The TXOP communication component 1020 may a request for UL transmission (RULT) during the on duration, the transmitting of the UL grant is based at least in part on the RULT. The TXOP indication component 1025 may transmit an UL transmission opportunity indication to the UE based at least in part on the identified transmission opportunity.

The transmitter 1030 may transmit signals received from other components of wireless device 1000. In some examples, the transmitter 1030 may be collocated with a receiver in a transceiver module. For example, the transmitter 1030 may be an example of aspects of the transceiver 1225 described with reference to FIG. 12. The transmitter 1030 may utilize a single antenna, or it may utilize a plurality of antennas.

Figure 11:
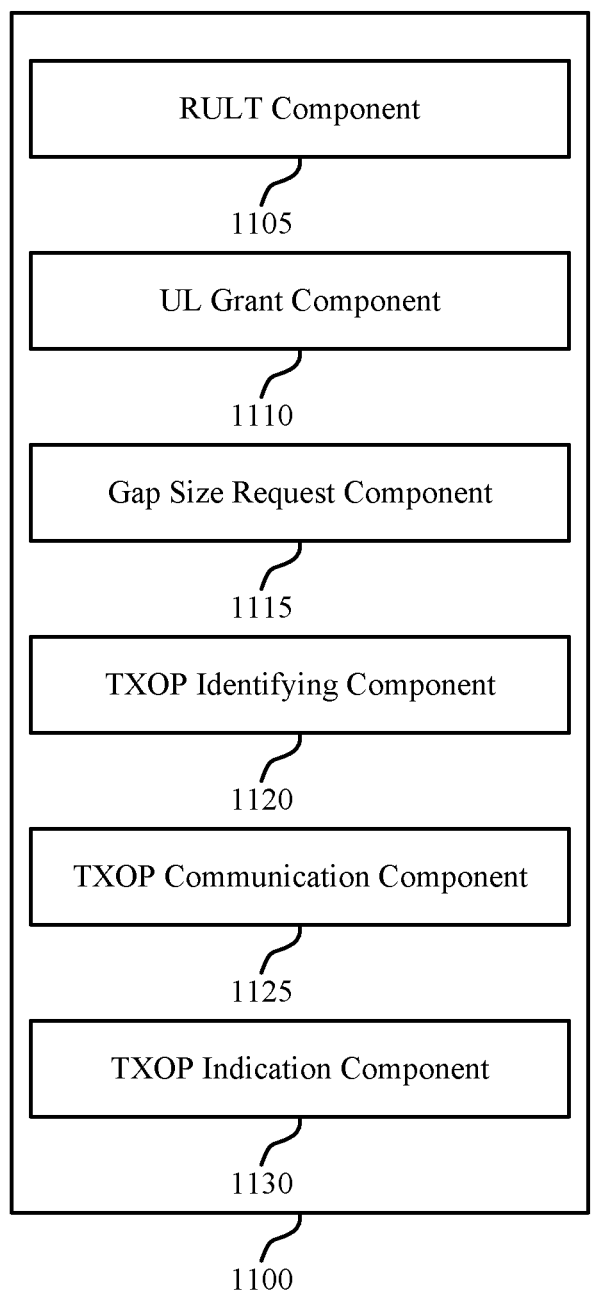

FIG. 11 shows a block diagram of a network dynamic DTX manager 1100 which may be an example of the corresponding component of wireless device 900 or wireless device 1000. That is, network dynamic DTX manager 1100 may be an example of aspects of network dynamic DTX manager 910 or network dynamic DTX manager 1010 described with reference to FIGS. 9 and 10. The network dynamic DTX manager 1100 may, additionally or alternatively, be an example of aspects of the network dynamic DTX manager 1205 described with reference to FIG. 12.

The network dynamic DTX manager 1100 may include a request uplink transmission (RULT) component 1105, UL grant component 1110, gap size request component 1115, TXOP identifying component 1120, TXOP communication component 1125 and TXOP indication component 1130. Each of these modules may communicate, directly or indirectly, with one another (e.g., via one or more buses).

The RULT component 1105 may receive request for UL transmission (RULT) during the on duration, the transmitting of the UL grant is based at least in part on the RULT.

The UL grant component 1110 may transmit an UL grant during an on duration of a DTX configuration established with the UE. In some cases, the UL transmission is received based at least in part on the UL grant. In some cases, the on duration is semi-statically determined based at least in part on the DTX configuration. In some cases, the on duration is scheduled based at least in part on a DRX configuration, a DTX configuration for one or more neighboring UEs, or both.

The gap size request component 1115 may receive a gap size request. In some cases, a transmission opportunity is identified based at least in part on the gap size request.

The TXOP identifying component 1120 may identify a transmission opportunity for a UE. In some cases, the transmission opportunity is identified based at least in part on a network load, a scheduling condition, a latency tolerance, a traffic profile, or any combination thereof.

The TXOP communication component 1125 may receive an UL transmission from the UE during the UL transmission opportunity. The TXOP indication component 1130 may transmit an UL transmission opportunity indication to the UE based at least in part on the identified transmission opportunity.

Figure 12:
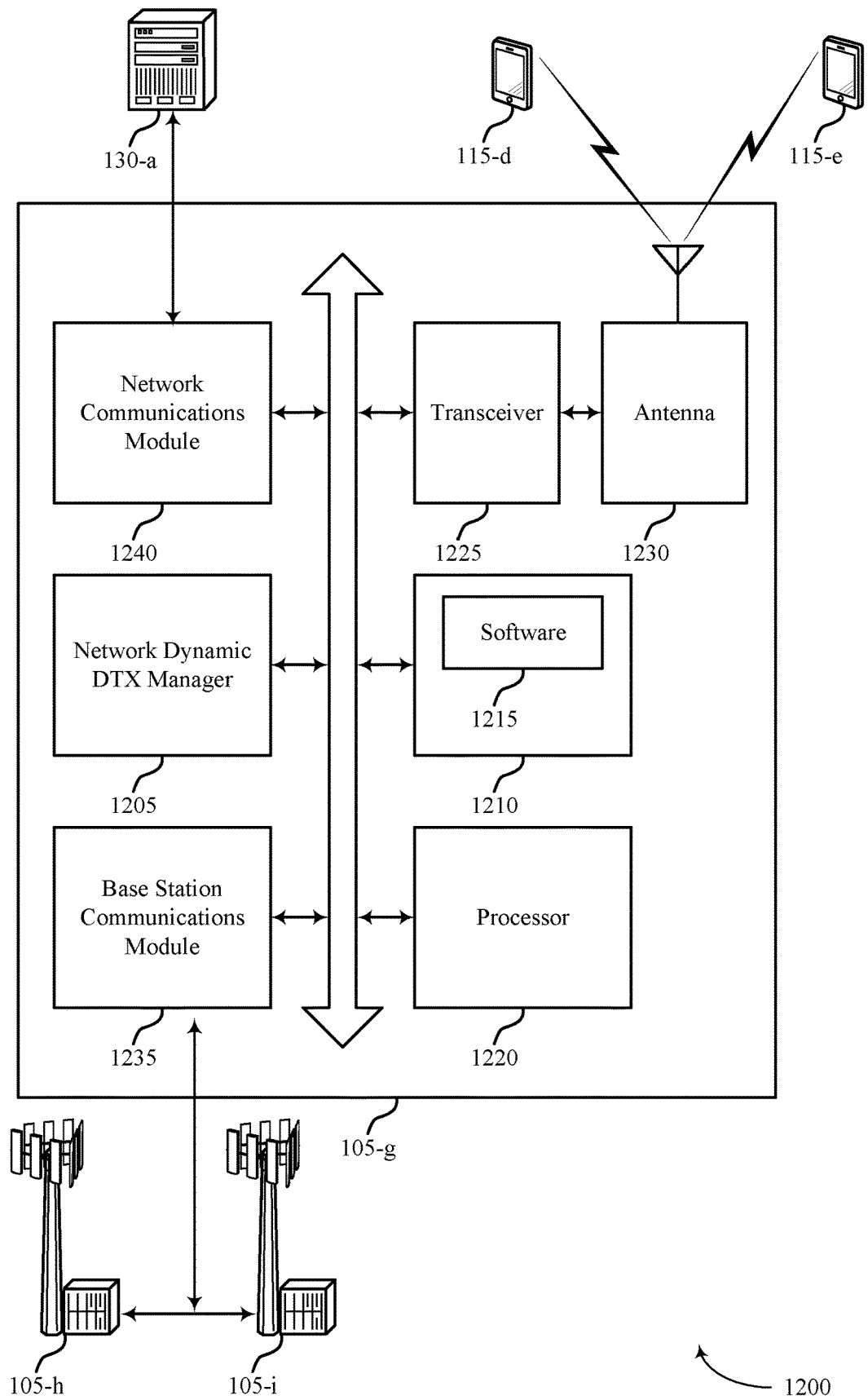
FIG. 12 illustrates a block diagram of a system including a network device that supports macro and micro DTX in accordance with aspects of the present disclosure.

FIG. 12 shows a diagram of a wireless system 1200 including a device configured that supports macro and micro DTX in accordance with various aspects of the present disclosure. For example, wireless system 1200 may include network device 105-g, which may be an example of a wireless device 900, a wireless device 1000, or a network device 105 as described with reference to FIGS. 1, 2 and 9 through 11. Network device 105-g may, additionally or alternatively, include components for bi-directional voice and data communications including components for transmitting communications and components for receiving communications. For example, network device 105-g may communicate bi-directionally with one or more UEs 115.

Network device 105-g may, additionally or alternatively, include network dynamic DTX manager 1205, memory 1210, processor 1220, transceiver 1225, antenna 1230, base station communications module 1235 and network communications module 1240. Each of these modules may communicate, directly or indirectly, with one another (e.g., via one or more buses). The network dynamic DTX manager 1205 may be an example of a network dynamic DTX manager as described with reference to FIGS. 9 through 11.

The memory 1210 may include RAM and ROM. The memory 1210 may store computer-readable, computer-executable software including instructions that, when executed, cause the processor to perform various functions described herein (e.g., macro and micro DTX, etc.). In some cases, the software 1215 may not be directly executable by the processor but may cause a computer (e.g., when compiled and executed) to perform functions described herein. The processor 1220 may include an intelligent hardware device, (e.g., a CPU, a microcontroller, an ASIC, etc.)

The transceiver 1225 may communicate bi-directionally, via one or more antennas, wired, or wireless links, with one or more networks, as described above. For example, the transceiver 1225 may communicate bi-directionally with a network device 105 or a UE 115. The transceiver 1225 may, additionally or alternatively, include a modem to modulate the packets and provide the modulated packets to the antennas for transmission, and to demodulate packets received from the antennas. In some cases, the wireless device may include a single antenna 1230. However, in some cases the device may have more than one antenna 830, which may be capable of concurrently transmitting or receiving multiple wireless transmissions.

The base station communications module 1235 may manage communications with other network device 105, and may include a controller or scheduler for controlling communications with UEs 115 in cooperation with other network devices 105. For example, the base station communications module 1235 may coordinate scheduling for transmissions to UEs 115 for various interference mitigation techniques such as beamforming or joint transmission. In some examples, base station communications module 1235 may provide an X2 interface within an LTE/LTE-A wireless communication network technology to provide communication between network devices 105.

The network communications module 1240 may manage communications with the core network (e.g., via one or more wired backhaul links). For example, the network communications module 1240 may manage the transfer of data communications for client devices, such as one or more UEs 115.

Figure 13:
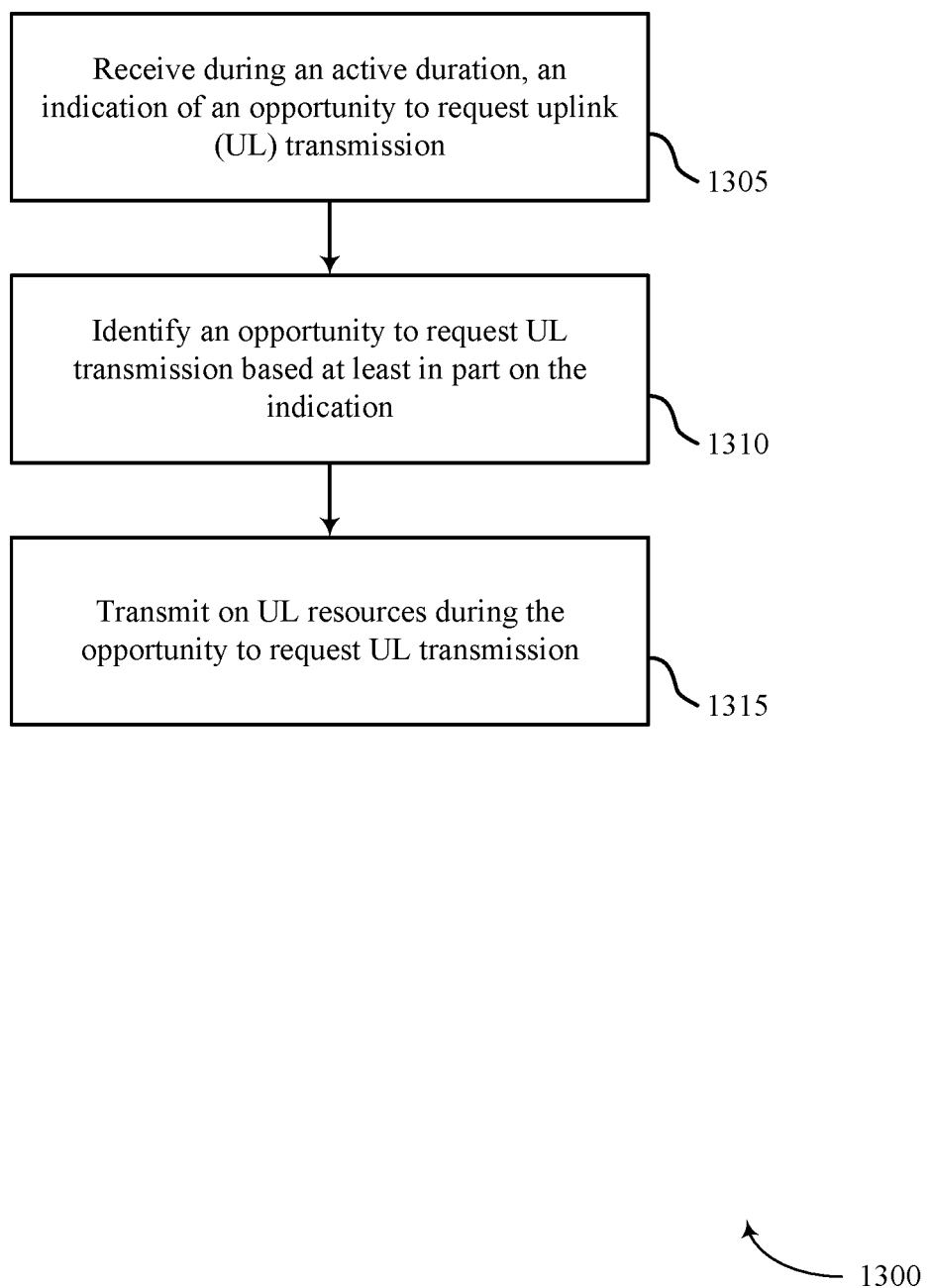
FIGS. 13 through 17 illustrate methods that supports macro and micro DTX in accordance with aspects of the present disclosure.

FIG. 13 shows a flowchart illustrating a method 1300 for macro and micro DTX in accordance with various aspects of the present disclosure. The operations of method 1300 may be implemented by a device such as a UE 115 or its components as described with reference to FIGS. 1 and 2. For example, the operations of method 1300 may be performed by the dynamic DTX manager as described herein. In some examples, the UE 115 may execute a set of codes to control the functional elements of the device to perform the functions described below. Additionally or alternatively, the UE 115 may perform aspects the functions described below using special-purpose hardware.

At block 1305, the UE 115 may receive during an active duration, an indication of an opportunity to request UL transmission as described above with reference to FIGS. 2 through 4. In some examples, the operations of block 1305 may be performed by the TXOP indication component as described with reference to FIGS. 6 and 7.

At block 1310, the UE 115 may identify an opportunity to request UL transmission based at least in part on the indication as described above with reference to FIGS. 2 through 4. In some examples, the operations of block 1310 may be performed by the TXOP identifying component as described with reference to FIGS. 6 and 7.

At block 1315, the UE 115 may transmit on UL resources during the opportunity to request the UL transmission as described above with reference to FIGS. 2 through 4. In some examples, the operations of block 1315 may be performed by the TXOP communication component as described with reference to FIGS. 6 and 7.

Figure 14:
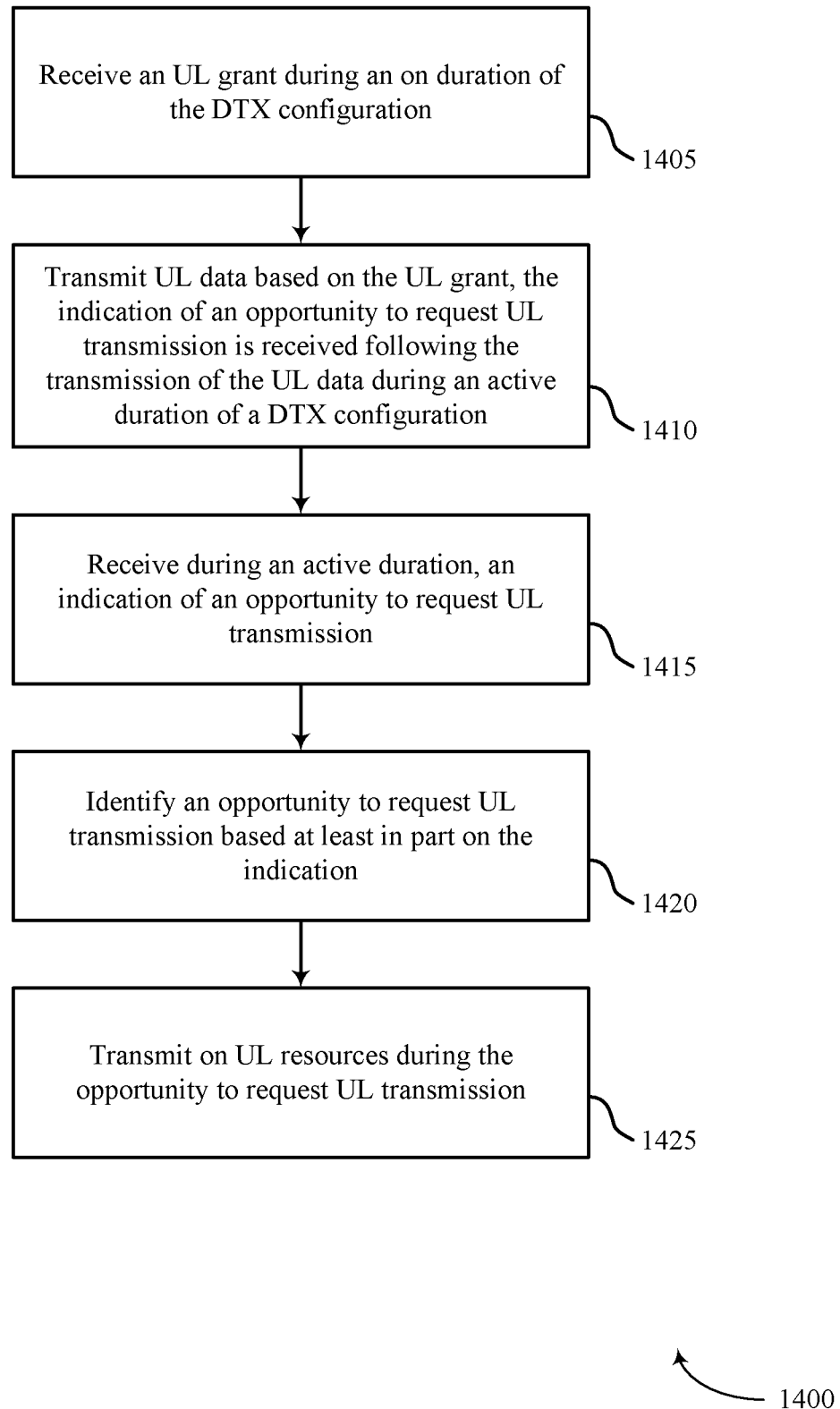

FIG. 14 shows a flowchart illustrating a method 1400 for macro and micro DTX in accordance with various aspects of the present disclosure. The operations of method 1400 may be implemented by a device such as a UE 115 or its components as described with reference to FIGS. 1 and 2. For example, the operations of method 1400 may be performed by the dynamic DTX manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may receive an UL grant during an on duration of the DTX configuration as described above with reference to FIGS. 2 through 4. In some examples, the operations of block 1405 may be performed by the UL grant component as described with reference to FIGS. 6 and 7.

At block 1410, the UE 115 may transmit UL data based at least in part on the UL grant, the indication of an opportunity to request the UL transmission is received following the transmission of the UL data during an active duration of a DTX configuration as described above with reference to FIGS. 2 through 4. In some examples, the operations of block 1410 may be performed by the UL data component as described with reference to FIGS. 6 and 7.

At block 1415, the UE 115 may receive during an active duration, an indication of an opportunity to request UL transmission as described above with reference to FIGS. 2 through 4. In some cases, the UL transmission opportunity indication is received during an active duration of a DTX configuration. In some examples, the operations of block 1415 may be performed by the TXOP indication component as described with reference to FIGS. 6 and 7.

At block 1420, the UE 115 may identify an opportunity to request UL transmission based at least in part on the indication as described above with reference to FIGS. 2 through 4. In some examples, the operations of block 1420 may be performed by the TXOP identifying component as described with reference to FIGS. 6 and 7.

At block 1425, the UE 115 may transmit on UL resources during the opportunity to request UL transmission as described above with reference to FIGS. 2 through 4. In some examples, the operations of block 1425 may be performed by the TXOP communication component as described with reference to FIGS. 6 and 7.

Figure 15:
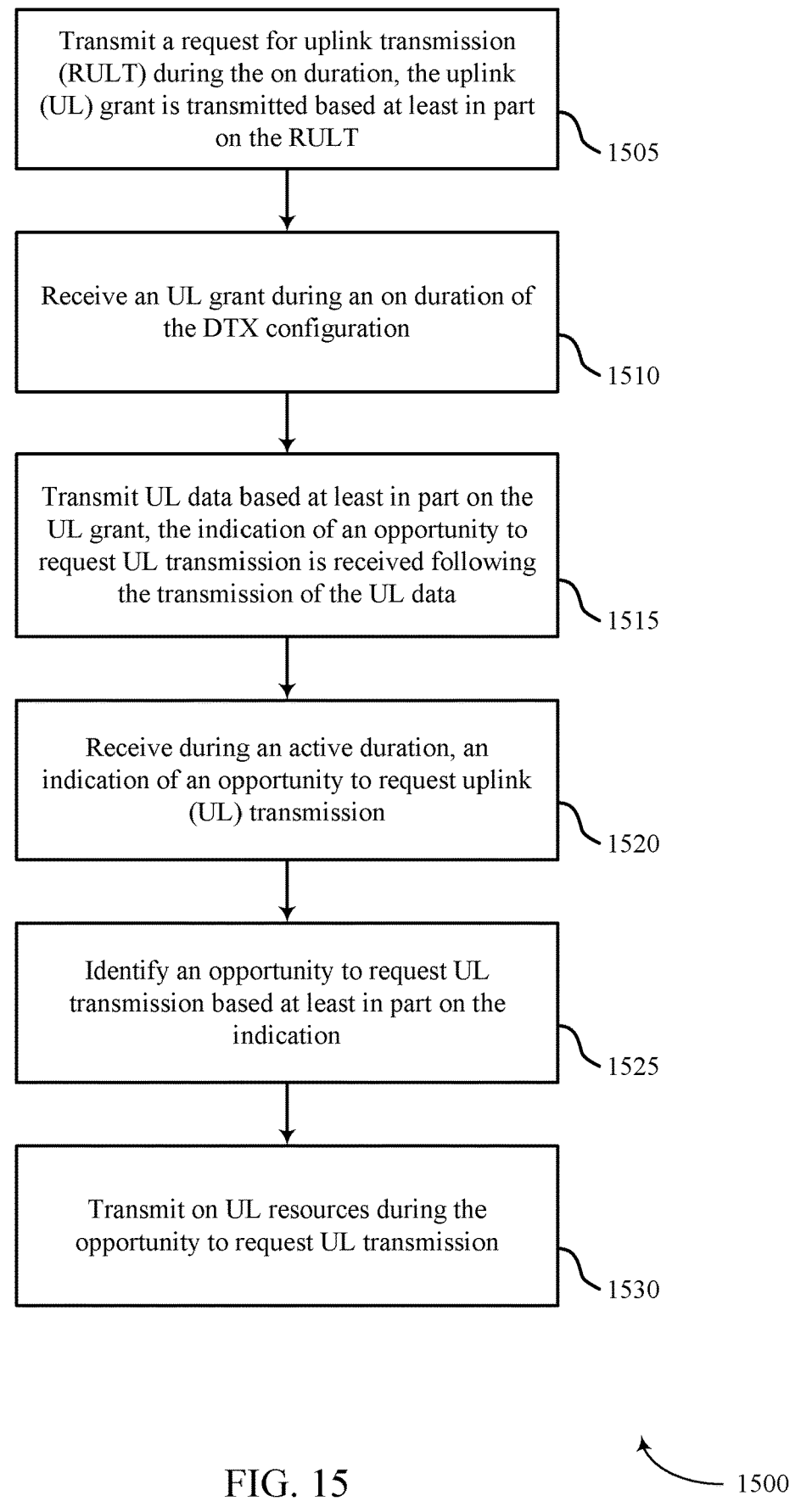

FIG. 15 shows a flowchart illustrating a method 1500 for macro and micro DTX in accordance with various aspects of the present disclosure. The operations of method 1500 may be implemented by a device such as a UE 115 or its components as described with reference to FIGS. 1 and 2. For example, the operations of method 1500 may be performed by the dynamic DTX manager as described herein. In some examples, the UE 115 may execute a set of codes to control the functional elements of the device to perform the functions described below. Additionally or alternatively, the UE 115 may perform aspects the functions described below using special-purpose hardware.

At block 1505, the UE 115 may transmit a request for UL transmission (RULT) during the on duration, the UL grant is transmitted based at least in part on the RULT as described above with reference to FIGS. 2 through 4. In some examples, the operations of block 1505 may be performed by the RULT component 715 as described with reference to FIGS. 6 and 7.

At block 1510, the UE 115 may receive an UL grant during an on duration of the DTX configuration as described above with reference to FIGS. 2 through 4. In some examples, the operations of block 1510 may be performed by the UL grant component as described with reference to FIGS. 6 and 7.

At block 1515, the UE 115 may transmit UL data based at least in part on the UL grant, the indication of an opportunity to request UL transmission is received following the transmission of the UL data as described above with reference to FIGS. 2 through 4. In some examples, the operations of block 1515 may be performed by the UL data component as described with reference to FIG. 7.

At block 1520, the UE 115 may receive during an active duration, an indication of an opportunity to request UL transmission as described above with reference to FIGS. 2 through 4. In some cases, the UL transmission opportunity indication is received during an active duration of a DTX configuration. In some examples, the operations of block 1520 may be performed by the TXOP indication component as described with reference to FIGS. 6 and 7.

At block 1525, the UE 115 may identify an opportunity to request UL transmission based at least in part on the indication as described above with reference to FIGS. 2 through 4. In some examples, the operations of block 1525 may be performed by the TXOP identifying component as described with reference to FIGS. 6 and 7.

At block 1530, the UE 115 may transmit on UL resources during the opportunity to request UL transmission as described above with reference to FIGS. 2 through 4. In some examples, the operations of block 1530 may be performed by the TXOP communication component as described with reference to FIGS. 6 and 7.

Figure 16:
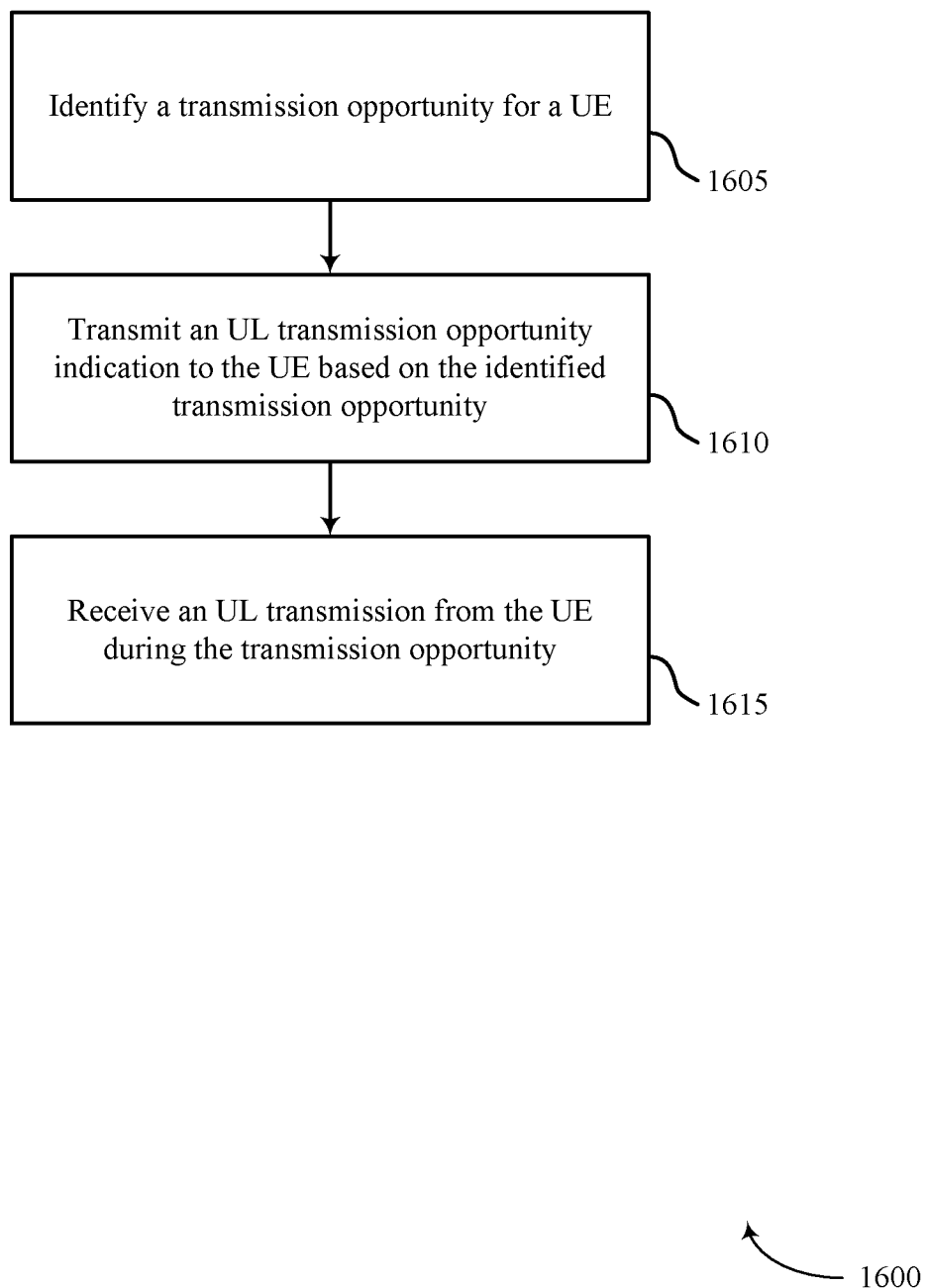

FIG. 16 shows a flowchart illustrating a method 1600 for macro and micro DTX in accordance with various aspects of the present disclosure. The operations of method 1600 may be implemented by a device such as a network device 105 or its components as described with reference to FIGS. 1 and 2. For example, the operations of method 1600 may be performed by the network dynamic DTX manager as described herein. In some examples, the network device 105 may execute a set of codes to control the functional elements of the device to perform the functions described below. Additionally or alternatively, the network device 105 may perform aspects the functions described below using special-purpose hardware.

At block 1605, the network device 105 may identify a transmission opportunity for a UE as described above with reference to FIGS. 2 through 4. A transmission opportunity may include, but is not limited to, an indication of an opportunity for the UE to request UL transmission. In some examples, the operations of block 1605 may be performed by the TXOP identifying component as described with reference to FIGS. 10 and 11.

At block 1610, the network device 105 may transmit an UL transmission opportunity indication to the UE based at least in part on the identified transmission opportunity as described above with reference to FIGS. 2 through 4. In some examples, the operations of block 1610 may be performed by the TXOP indication component as described with reference to FIGS. 10 and 11.

At block 1615, the network device 105 may receive an UL transmission from the UE during the transmission opportunity as described above with reference to FIGS. 2 through 4. In some examples, the operations of block 1615 may be performed by the TXOP communication component as described with reference to FIGS. 10 and 11.

Figure 17:
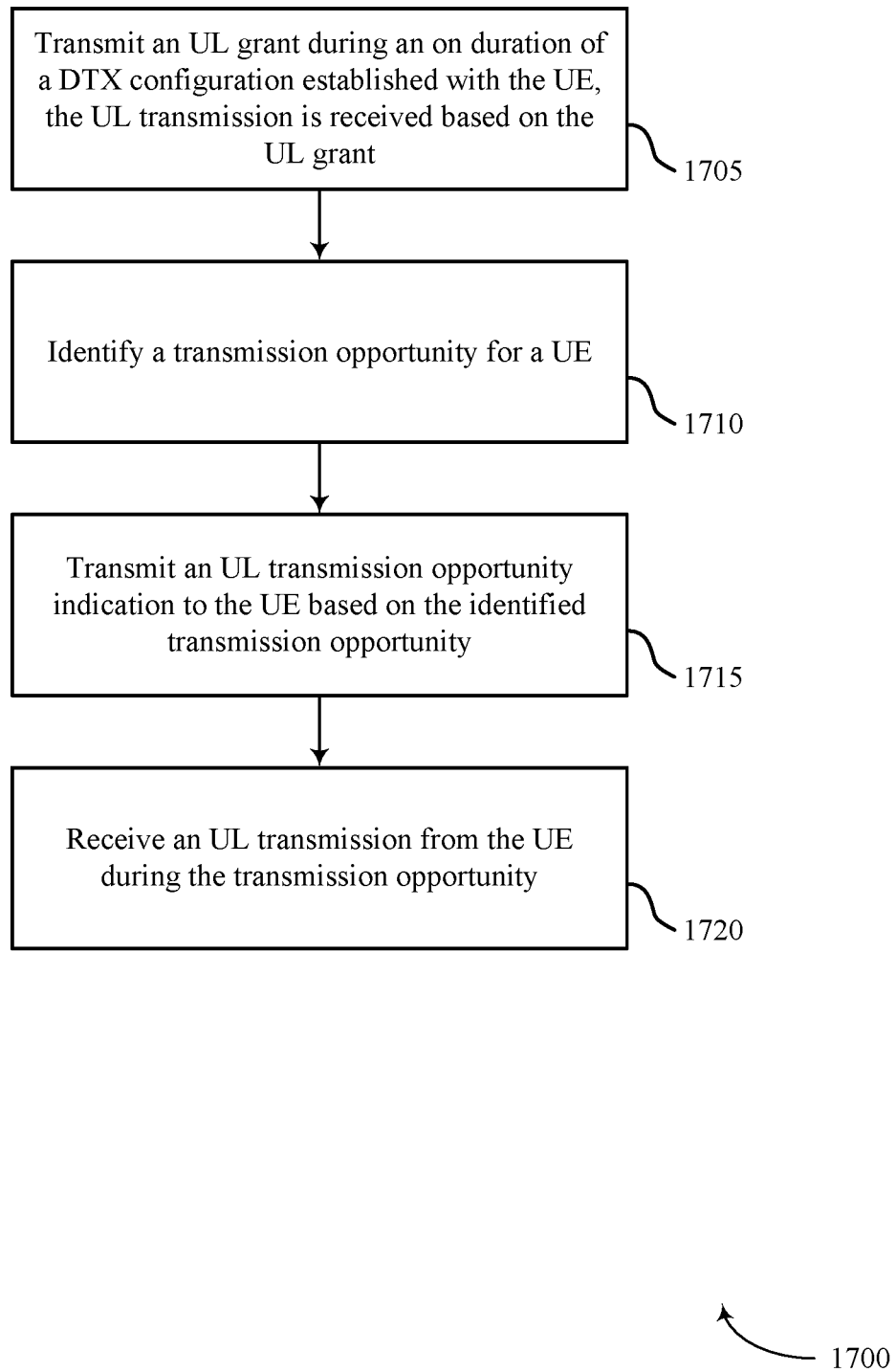

FIG. 17 shows a flowchart illustrating a method 1700 for macro and micro DTX in accordance with various aspects of the present disclosure. The operations of method 1700 may be implemented by a device such as a network device 105 or its components as described with reference to FIGS. 1 and 2. For example, the operations of method 1700 may be performed by the network dynamic DTX manager as described herein. In some examples, the network device 105 may execute a set of codes to control the functional elements of the device to perform the functions described below. Additionally or alternatively, the network device 105 may perform aspects the functions described below using special-purpose hardware.

At block 1705, the network device 105 may transmit an UL grant during an on duration of a DTX configuration established with the UE. In some cases, the UL transmission is received based at least in part on the UL grant as described above with reference to FIGS. 2 through 4. In some examples, the operations of block 1705 may be performed by the UL grant component as described with reference to FIGS. 10 and 11.

At block 1710, the network device 105 may identify a transmission opportunity for a UE as described above with reference to FIGS. 2 through 4. In some examples, the operations of block 1710 may be performed by the TXOP identifying component as described with reference to FIGS. 10 and 11.

At block 1715, the network device 105 may transmit an UL transmission opportunity indication to the UE based at least in part on the identified transmission opportunity as described above with reference to FIGS. 2 through 4. In some examples, the operations of block 1715 may be performed by the TXOP indication component as described with reference to FIGS. 10 and 11.

At block 1720, the network device 105 may receive an UL transmission from the UE during the transmission opportunity as described above with reference to FIGS. 2 through 4. In some examples, the operations of block 1720 may be performed by the TXOP communication component as described with reference to FIGS. 10 and 11.

It should be noted that these methods describe possible implementation, and that the operations and the blocks may be rearranged or otherwise modified such that other implementations are possible. In some examples, aspects from two or more of the methods may be combined. For example, aspects of each of the methods may include blocks or aspects of the other methods, or other blocks or techniques described herein. Thus, aspects of the disclosure may provide for macro and micro DTX.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may, additionally or alternatively, be physically located at various positions, including being distributed such that portions of functions are implemented at different physical (PHY) locations. Additionally or alternatively, as used herein, including in the claims, "or" as used in a list of items (for example, a list of items prefaced by a phrase such as "at least one of" or "one or more") indicates an inclusive list such that, for example, a list of at least one of A, B, or C means A or B or C or AB or AC or BC or ABC (i.e., A and B and C).

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Additionally or alternatively, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are, additionally or alternatively, included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1×, 1×, etc. IS-856 (TIA-856) is commonly referred to as CDMA2000 1×EV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (Universal Mobile Telecommunications System (UMTS)). 3GPP Long Term Evolution (LTE) and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term evolved node B (eNB) may be, for example, used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" is a 3GPP term that can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell, may for example, cover a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may, additionally or alternatively, cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may, additionally or alternatively, be called forward link transmissions while the UL transmissions may, additionally or alternatively, be called reverse link transmissions. Each communication link described herein including, for example, wireless communication system 100 and 200 of FIGS. 1 and 2 may include one or more carriers, each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for macro and micro DTX. It should be noted that these methods describe possible implementations, and that the operations and the blocks may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may, additionally or alternatively, be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may, additionally or alternatively, be implemented, in whole or in part, with instructions embodied in a memory, formatted to be executed by one or more general or application-specific processors.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

What is claimed is:

1. An apparatus for wireless communication, comprising:
one or more processors; and
memory coupled to the one or more processors, the one or more processors configured to:
transition from an inactive duration to a semi-statically configured active duration following the inactive duration;
receive, via a communication link and during the semi-statically configured active duration, a message comprising an indication of an opportunity to request uplink transmission; and
transmit on an uplink resource during the opportunity to request uplink transmission based at least in part on the indication of the opportunity to request uplink transmission.

2. The apparatus of claim 1, wherein a discontinuous transmission configuration including the semi-statically configured active duration is based at least in part on a discontinuous reception configuration, a discontinuous transmission configuration for one or more neighboring user equipments (UEs), or both.

3. The apparatus of claim 1, wherein the one or more processors are further configured to:
receive an uplink grant during an on duration of a discontinuous transmission configuration; and
transmit uplink data based at least in part on the uplink grant, wherein the message comprising the indication of the opportunity to request uplink transmission is received following the transmission of the uplink data.

4. The apparatus of claim 3, wherein the on duration is semi-statically determined based at least in part on the discontinuous transmission configuration.

5. The apparatus of claim 3, wherein the one or more processors are further configured to:

transmit a request for uplink transmission during the on duration, wherein the uplink grant is transmitted based at least in part on the request for uplink transmission.

6. The apparatus of claim 3, wherein the one or more processors are further configured to:
transition to a short cycle of the discontinuous transmission configuration based at least in part on the indication of the opportunity to request uplink transmission.

7. The apparatus of claim 3, wherein the one or more processors are further configured to:
transition from a short cycle of the discontinuous transmission configuration to a long cycle of the discontinuous transmission configuration based at least in part on one or more of a determination that an inactivity timer has expired, the indication of the opportunity to request uplink transmission, or a beginning of a subsequent long cycle of the discontinuous transmission configuration, or any combination thereof.

8. The apparatus of claim 1, wherein the semi-statically configured active duration comprises an active duration of a discontinuous reception configuration.

9. The apparatus of claim 8, wherein the one or more processors are further configured to:
receive an uplink grant during an on duration of the discontinuous reception configuration; and
transmit uplink data based at least in part on the uplink grant, wherein, to receive the message comprising the indication, the one or more processors are configured to:
receive the message comprising the indication of the opportunity to request uplink transmission following the transmission of the uplink data.

10. The apparatus of claim 9, wherein the on duration is semi-statically determined based at least in part on the discontinuous reception configuration.

11. The apparatus of claim 9, wherein the one or more processors are further configured to:
transmit a request for uplink transmission during the on duration, wherein the uplink grant is transmitted based at least in part on the request for uplink transmission.

12. The apparatus of claim 1, wherein the opportunity to request uplink transmission is based at least in part on a network load, a scheduling condition, a latency tolerance, a traffic profile, a gap size request by a user equipment (UE) or any combination thereof.

13. The apparatus of claim 1, wherein, to transmit on the uplink resource, the one or more processors are configured to:
transmit a request for uplink transmission on the uplink resource.

14. The apparatus of claim 1, wherein, to transmit on the uplink resource, the one or more processors are configured to:
transmit uplink data or control data at a time instance identified by the indication.

15. The apparatus of claim 1, wherein the one or more processors are further configured to:
determine that no data is available for transmission during the opportunity to request uplink transmission; and
refrain from transmitting during the opportunity based at least in part on the determining.

16. The apparatus of claim 1, wherein the indication of the opportunity to request uplink transmission comprises an opportunity associated with a different radio access technology (RAT).

17. The apparatus of claim 1, wherein the one or more processors are further configured to:
refrain from transmitting on the uplink resource during a first time duration different than a second time duration associated with the opportunity to request uplink transmission.

18. An apparatus for wireless communication, comprising:
one or more processors; and
memory coupled to the one or more processors, the one or more processors configured to:
transmit, via a communication link to a user equipment (UE) and during a semi-statically configured active duration of the UE that follows an inactive duration of the UE, a message comprising an indication of an opportunity for uplink transmission; and
receive an uplink transmission from the UE based at least in part on the indication of the opportunity for uplink transmission.

19. The apparatus of claim 18, wherein the one or more processors are further configured to:
transmit an uplink grant during an on duration of a discontinuous transmission configuration established with the UE, wherein, to receive the uplink transmission, the one or more processors are configured to:
receive the uplink transmission based at least in part on the uplink grant.

20. The apparatus of claim 19, wherein the on duration is semi-statically determined based at least in part on the discontinuous transmission configuration.

21. The apparatus of claim 19, wherein the one or more processors are further configured to:
receive a request for uplink transmission during the on duration, wherein the transmitting of the uplink grant is based at least in part on the request for uplink transmission.

22. The apparatus of claim 19, wherein the on duration is scheduled based at least in part on a discontinuous reception configuration, a discontinuous transmission configuration for one or more neighboring UEs, or both.

23. The apparatus of claim 18, wherein the opportunity is based at least in part on a network load, a scheduling condition, a latency tolerance, a traffic profile, or any combination thereof.

24. A method of wireless communication comprising:
transitioning from an inactive duration to a semi-statically configured active duration following the inactive duration;
receiving, via a communication link and during the semi-statically configured active duration following the inactive duration, a message comprising an indication of an opportunity to request uplink transmission; and
transmitting on an uplink resource during the opportunity to request uplink transmission based at least in part on the indication of the opportunity to request uplink transmission.

25. The method of claim 24, wherein a discontinuous transmission configuration including the semi-statically configured active duration is based at least in part on a discontinuous reception configuration, a discontinuous transmission configuration for one or more neighboring user equipments (UEs), or both.

26. The method of claim 24, further comprising:
receiving an uplink grant during an on duration of a discontinuous transmission configuration; and
transmitting uplink data based at least in part on the uplink grant, wherein receiving the message comprising the indication comprises:

receiving the message comprising the indication of the opportunity to request uplink transmission following the transmission of the uplink data.

27. The method of claim 26, wherein the on duration is semi-statically determined based at least in part on the discontinuous transmission configuration.

28. The method of claim 26, further comprising:
transmitting a request for uplink transmission during the on duration, wherein the uplink grant is transmitted based at least in part on the request for uplink transmission.

* * * * *